United States Patent
Ogawa et al.

(10) Patent No.: US 12,318,939 B2
(45) Date of Patent: Jun. 3, 2025

(54) CONTROL DEVICE, CONTROL METHOD AND STORAGE MEDIUM

(71) Applicant: NEC Corporation, Tokyo (JP)

(72) Inventors: Masatsugu Ogawa, Tokyo (JP); Hisaya Wakayama, Tokyo (JP); Takehiro Itou, Tokyo (JP); Mineto Satoh, Tokyo (JP); Hiroyuki Oyama, Tokyo (JP); Nobuharu Kami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 234 days.

(21) Appl. No.: 17/799,717

(22) PCT Filed: Feb. 25, 2020

(86) PCT No.: PCT/JP2020/007428
§ 371 (c)(1),
(2) Date: Aug. 15, 2022

(87) PCT Pub. No.: WO2021/171353
PCT Pub. Date: Sep. 2, 2021

(65) Prior Publication Data
US 2023/0080565 A1    Mar. 16, 2023

(51) Int. Cl.
*B25J 9/16* (2006.01)

(52) U.S. Cl.
CPC .......... *B25J 9/1661* (2013.01); *B25J 9/163* (2013.01)

(58) Field of Classification Search
CPC ........ B25J 9/1661; B25J 9/163; B25J 9/1671; G05B 2219/40113; G05B 2219/40115; G05B 2219/40336; G05B 2219/40419
USPC .......................................................... 700/245
See application file for complete search history.

(56) References Cited

U.S. PATENT DOCUMENTS

| | | | |
|---|---|---|---|
| 8,447,863 | B1 | 5/2013 | Francis et al. |
| 2012/0072023 | A1 | 3/2012 | Ota |
| 2013/0238131 | A1 | 9/2013 | Kondo et al. |
| 2014/0200714 | A1 | 7/2014 | Kawamoto et al. |

(Continued)

FOREIGN PATENT DOCUMENTS

| | | |
|---|---|---|
| EP | 4023396 A1 | 7/2022 |
| JP | 2011-020218 A | 2/2011 |

(Continued)

OTHER PUBLICATIONS

JP Office Action for JP Application No. 2022-502359, mailed on Aug. 1, 2023 with English Translation.

(Continued)

*Primary Examiner* — Kira Nguyen

(57) ABSTRACT

A control device 1A mainly includes a display control means 15A and an operation sequence generation means 16A. The display control means 15A is configured to transmit display information S2 relating to a task to be executed by a robot to a display device 2A. The operation sequence generation means 16A is configured, in a case that the display control means 15A has received, from the display device 2A, task designation information that is input information which schematically specifies the task, to generate an operation sequence to be executed by the robot based on the task designation information Ia.

10 Claims, 13 Drawing Sheets

(56) References Cited

U.S. PATENT DOCUMENTS

| | | | |
|---|---|---|---|
| 2015/0331415 A1* | 11/2015 | Feniello | G05B 19/425 |
| | | | 901/5 |
| 2018/0085922 A1 | 3/2018 | Ooba | |
| 2018/0330200 A1 | 11/2018 | Shibata et al. | |
| 2019/0001489 A1 | 1/2019 | Hudson et al. | |
| 2021/0032031 A1* | 2/2021 | Kalouche | B25J 19/0025 |
| 2021/0162600 A1* | 6/2021 | Clever | B25J 9/1605 |
| 2021/0291382 A1* | 9/2021 | Hashimoto | B25J 13/065 |
| 2022/0088775 A1* | 3/2022 | Hasunuma | B25J 9/1661 |
| 2022/0355475 A1 | 11/2022 | Oyama | |

FOREIGN PATENT DOCUMENTS

| | | |
|---|---|---|
| JP | 2011-108156 A | 6/2011 |
| JP | 2012-022457 A | 2/2012 |
| JP | 2012-066378 A | 4/2012 |
| JP | 2013-031896 A | 2/2013 |
| JP | 2013-184257 A | 9/2013 |
| JP | 2017-047519 A | 3/2017 |
| JP | 2018-051684 A | 4/2018 |
| JP | 2018-190241 A | 11/2018 |

OTHER PUBLICATIONS

International Search Report for PCT Application No. PCT/JP2020/007428, mailed on Apr. 7, 2020.
Extended European Search Report for EP Application No. 20921893.2, dated on Mar. 16, 2023.

\* cited by examiner

CONTROL DEVICE, CONTROL METHOD AND STORAGE MEDIUM

This application is a National Stage Entry of PCT/JP2020/007428 filed on Feb. 25, 2020, the contents of all of which are incorporated herein by reference, in their entirety.

TECHNICAL FIELD

The present invention relates to a technical field of a control device, a control method, and a storage medium for performing processing related to tasks to be executed by a robot.

BACKGROUND ART

There is proposed such a control method to perform control of a robot necessary for executing the task when a task to be performed by a robot is given. For example, Patent Literature 1 discloses a robot controller configured, when placing a plurality of objects in a container by a robot with a hand for gripping an object, to determine possible orders of gripping the objects by the hand and to determine the order of the objects to be placed in the container based on the index calculated with respect to each of the possible orders.

CITATION LIST

Patent Literature

Patent Literature 1: JP 2018-51684A

SUMMARY

Problem to be Solved

When a control input for causing a robot to execute a task is manually determined, a worker who performs an instruction requires deep knowledge regarding a robot, and a communication environment in which a robot and a device which instructs the robot can communicate in real time is required. Patent Literature 1 is silent on the control of the robot in consideration of such an issue.

In view of the issues described above, one object of the present invention is to provide a control device, a control method, and a storage medium capable of causing a robot to suitably execute a task.

Means for Solving the Problem

In one mode of the control device, there is provided a control device including: a display control means configured to transmit display information relating to a task to be executed by a robot to a display device; and an operation sequence generation means configured, in a case that the display control means has received, from the display device, task designation information that is input information which schematically specifies the task, to generate an operation sequence to be executed by the robot based on the task designation information.

In one mode of the control method, there is provided a control method executed by a computer, the control method including: transmitting display information relating to a task to be executed by a robot to a display device; and, in a case of receiving, from the display device, task designation information that is input information which schematically specifies the task, generating an operation sequence to be executed by the robot based on the task designation information.

In one mode of the storage medium, there is provided a storage medium storing a program executed by a computer, the program causing the computer to function as: a display control means configured to transmit display information relating to a task to be executed by a robot to a display device; and an operation sequence generation means configured, in a case that the display control means has received, from the display device, task designation information that is input information which schematically specifies the task, to generate an operation sequence to be executed by the robot based on the task designation information.

Effect

An example advantage according to the present invention is to cause a robot to suitably execute a task.

EXAMPLE EMBODIMENTS

Hereinafter, an example embodiment of a control device, a control method, and a storage medium will be described with reference to the drawings.

First Example Embodiment (1) System Configuration

Figure 1:
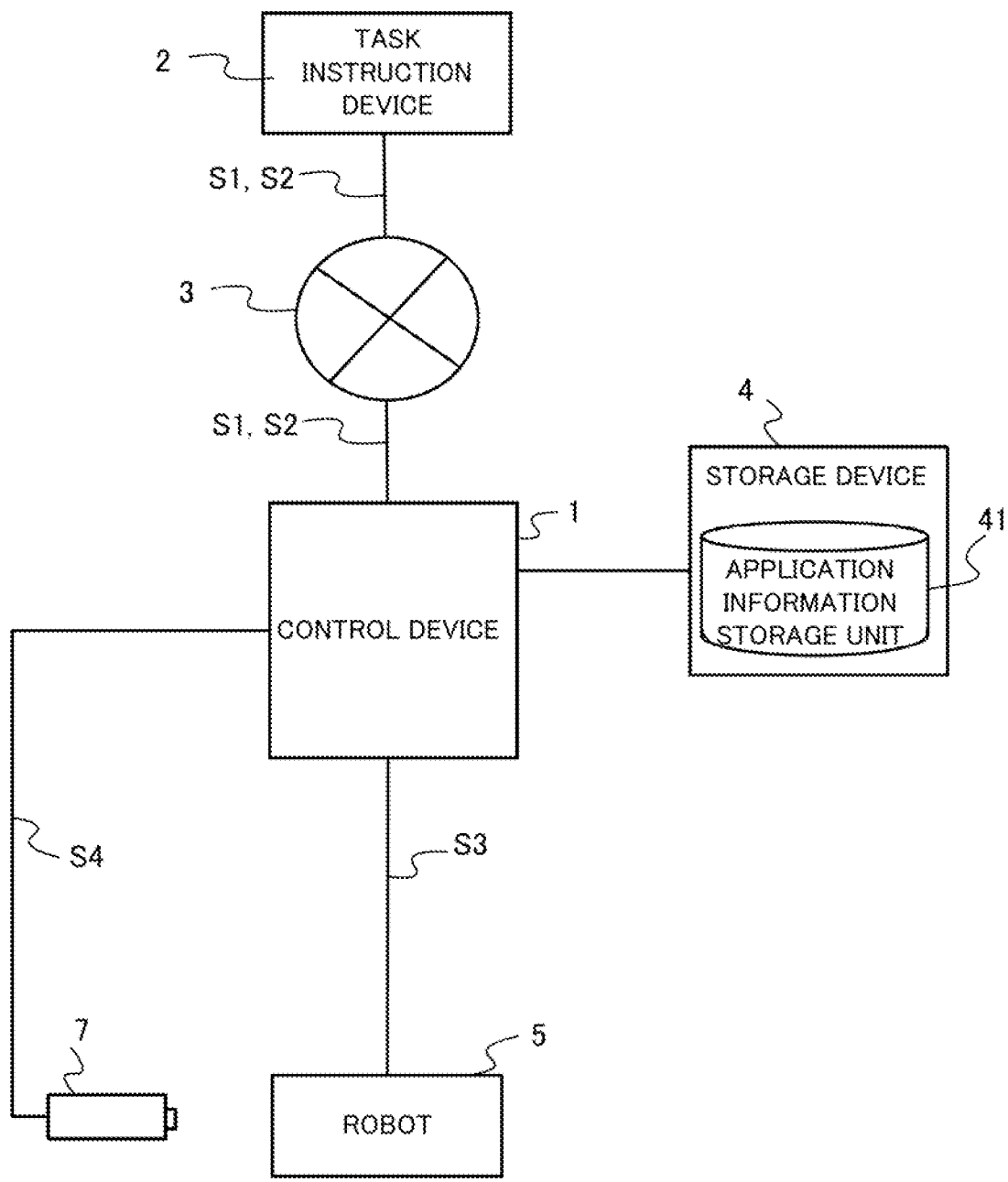
FIG. 1 illustrates a configuration of a robot control system in the first example embodiment.

FIG. 1 shows a configuration of a robot control system 100 according to the first example embodiment. The robot control system 100 mainly includes a control device 1, a task instruction device 2, a storage device 4, a robot 5, and a measurement device 7.

When a task (also referred to as "objective task") to be performed by the robot 5 is specified, the information processing device 1 converts the objective task into a time step sequence of simple tasks each of which the robot 5 can accept, and controls the robot 5 based on the sequence. Hereafter, a simple task in units of command that can be accepted by the robot 5 is also referred to as "subtask" and a sequence of subtasks to be executed by each of the robots 5 in order to achieve the objective task is referred to as "subtask sequence". The subtask sequence corresponds to an operation (motion) sequence which defines a series of operations to be executed by the robot 5.

The control device 1 performs data communication with the task instruction device 2 through the communication network 3. Here, it is assumed that the communication network 3 corresponds to a communication network such as the Internet where the communication quality is not guaranteed, and therefore the communication delay could occur in the data communication between the control device 1 and the task instruction device 2. The communication delay leads to a condition in which the robot 5 does not properly operate according to a control signal (which refers to a signal representing a direct control input to the robot 5 such as torque, speed, and joint angle) for controlling the robot 5 sent from the task instruction device 2. The control device 1 receives, from the task instruction device 2, input information "S1" for specifying an objective task via the communication network 3. Further, the control device 1 transmits the display information "S2" relating to the task to be executed by the robot 5 to the task instruction device 2 via the communication network 3.

Further, the control device 1 performs wireless or wired data communication with the storage device 4, the robot 5, and the measurement device 7. For example, the control device 1 transmits a control signal "S3" relating to the control of the robot 5 to the robot 5. Further, the control unit 1 receives the output signal "S4" from the measurement device 7. Hereinafter, it is assumed that the control device 1 communicates with the storage device 4, the robot 5, and the measurement device 7 by wired or wireless direct communication or by using a communication network in which the communication quality such as bandwidth guarantee is guaranteed so as to ensure real-time communication.

The task instruction device 2 is a device configured to accept an input regarding the objective task by a worker who designates the objective task. The task instruction device 2 displays information based on the display information S2 supplied from the control device 1, or supplies the input information S1 generated based on the input from the worker to the control device 1. The task instruction device 2 may be a tablet terminal equipped with an input unit and a display unit, or may be a stationary personal computer.

The storage device 4 includes an application information storage unit 41. The application information storage unit 41 stores application information necessary for generating a subtask sequence from the objective task. Details of the application information will be described later with reference to FIG. 3. The storage device 4 may be an external storage device such as a hard disk connected to or built in to the control device 1, or may be a storage medium such as a flash memory. The storage device 4 may be one or more server devices configured to perform data communication with the control device 1 through a communication network. In this case, the storage device 4 may be configured by a plurality of server devices.

The robot 5 works on the objective task based on the control signal S3 supplied from the control device 1. The robot 5 may be any type of robot such as a vertical articulated robot and a horizontal articulated robot. The robot 5 may supply a state signal indicating the state of the robot 5 to the control device 1. The state signal may be an output signal from a sensor for detecting a state (such as position and angle) of the entire robot 5 or specific portions thereof such as joints of the robot 5, or may be a signal, which is generated by a control unit of the robot 5, indicating the progress of subtasks to be executed by the robot 5.

The measurement device 7 is one or more sensors configured to detect the state within the workspace in which the objective task is performed and examples of the measurement device 7 include a camera, a range finder sensor, a sonar, and a combination thereof. In the present example embodiment, the measurement device 7 is assumed to include at least one camera for imaging the workspace. The measurement device 7 supplies the generated output signal S4 to the control device 1. The output signal S4 at least includes an image obtained by imaging the workspace. The measurement device 7 may be a self-propelled sensor or a flying sensor (including a drone) that moves within the workspace. The measurement device 7 may also include a sensor provided in the robot 5, and a sensor provided in another object existing in the workspace. The measurement device 7 may also include a sensor configured to detect sounds in the workspace. Thus, the measurement device 7 may include various sensors configured to detect a state in the workspace and may be provided at any place.

The configuration of the robot control system 100 shown in FIG. 1 is an example, and various changes may be applied to the configuration. For example, the robot 5 may be configured by plural robots or the robot 5 may be equipped with plural targets of control which operate independently such as robot arms. Even in these cases, the control device 1 generates a subtask sequence to be executed for each robot 5 or for each target of control based on the objective task, and transmits the control signal S3 based on the subtask sequence to the robot 5. The robot 5 may perform cooperative work with other robots, workers or working machine (also referred to as "other working bodies") which operate in the workspace. The measurement device 7 may be a part of the robot 5. Further, the task instruction device 2 may be integrated with the control device 1. Further, the control device 1 may be configured by a plurality of devices. In this case, the plurality of devices functioning as the control device 1 exchange information necessary to execute the pre-allocated process among the devices. Further, the robot 5 may incorporate all or at least a part of the functions of the control device 1.

(2) Hardware Configuration

Figure 2A:
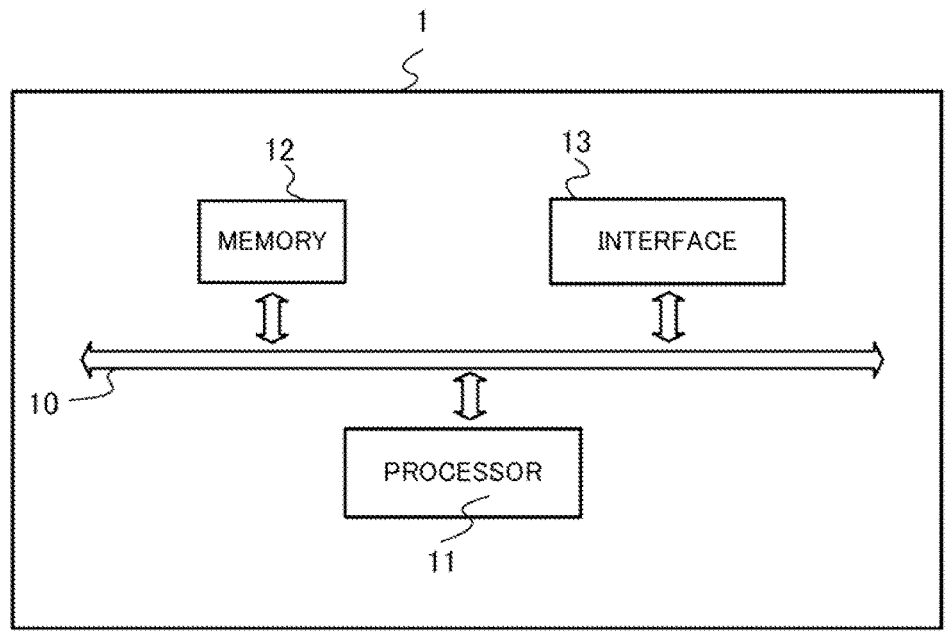
FIG. 2 illustrates the hardware configuration of a control device.

FIG. 2A shows a hardware configuration of the control device 1. The control device 1 includes, as hardware, a processor 11, a memory 12, and an interface 13. The processor 11, the memory 12, and the interface 13 are connected via a data bus 10 to one another.

The processor 11 executes a predetermined process by executing a program stored in the memory 12. The processor 11 is one or more processors such as a CPU (Central Processing Unit) and a GPU (Graphics Processing Unit).

The memory 12 is configured by various volatile and non-volatile memories such as a RAM (Random Access Memory) and a ROM (Read Only Memory). Further, the memory 12 stores a program for the control device 1 to execute a predetermined process. The memory 12 is used as a work memory and temporarily stores information acquired from the storage device 4. The memory 12 may function as a storage device 4. In contrasts, the storage device 4 may function as the memory 12 of the control device 1. The program executed by the control device 1 may be stored in a storage medium other than the memory 12.

The interface 13 is an interface for electrically connecting the control device 1 to other external devices. For example, the interface 13 includes an interface for connecting the control device 1 to the task instruction device 2, and an interface for connecting the control device 1 to the storage device 4. The interface 13 includes an interface for connecting the control device 1 to the robot 5, and an interface for connecting the control device 1 to the measurement device 7. These connections may be wired connections or may be wireless connections. For example, the interface for connecting the control device 1 to these external devices may be a communication interface for wired or wireless transmission and reception of data to and from these external devices under the control of the processor 11. In another example, the control device 1 and the external devices may be connected by a cable or the like. In this case, the interface 13 includes an interface which conforms to an USB (Universal Serial Bus), a SATA (Serial AT Attachment), or the like for exchanging data with the external devices.

The hardware configuration of the control device 1 is not limited to the configuration shown in FIG. 2A. For example, the control device 1 may be connected to or incorporate a display device, an input device, or sound output device. Further, the control device 1 may include at least one of the task instruction device 2 or the storage device 4.

Figure 2B:
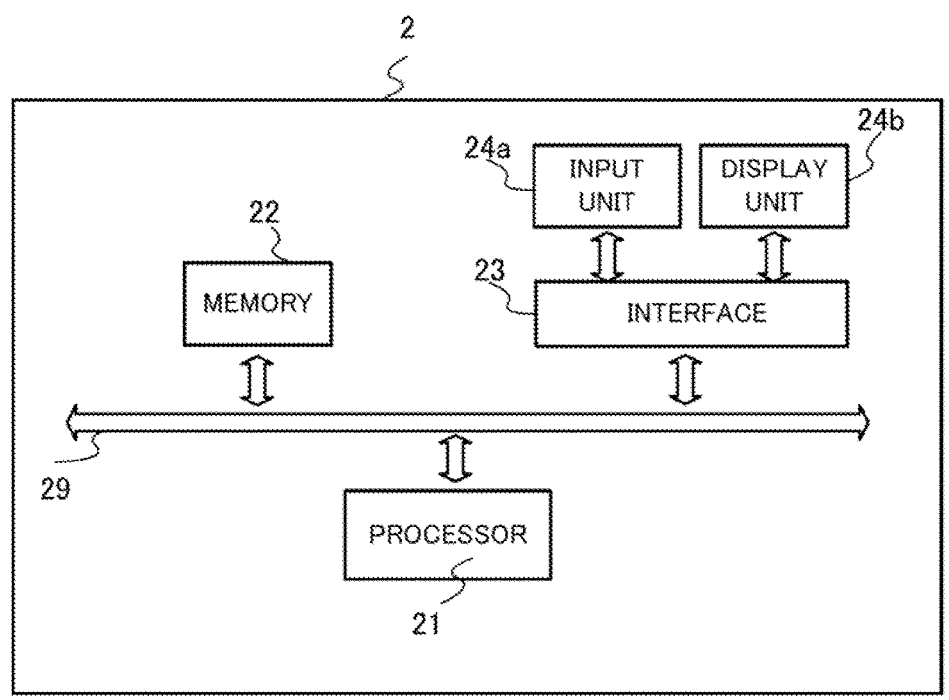

FIG. 2B shows a hardware configuration of the task instruction device 2. The task instruction device 2 includes, as hardware, a processor 21, a memory 22, an interface 23, an input unit 24a, and a display unit 24b. The processor 21, the memory 22, and the interface 23 are connected via a data bus 29 to one another. Further, the input unit 24a and the display unit 24b is connected to the interface 23.

The processor 21 executes predetermined processing by executing a program stored in the memory 22. The processor 21 is one or more processors such as a CPU, a GPU, and the like. The processor 21 generates the input signal S1 by receiving the signal generated by the input unit 24a via the interface 23, and transmits the input signal S1 to the control device 1 via the interface 23. Further, the processor 21 supplies the display unit 24b via the interface 23 with the display signal S2 received from the control device 1 via the interface 23.

The memory 22 is configured by various memories such as a RAM and a ROM. The memory 22 stores a program for the task instruction device 2 to execute a predetermined process. The memory 22 is also used as a working memory. The memory 22 may also include non-volatile memory such as a flash memory and a hard disk.

The interface 23 is an interface for electrically connecting the task instruction device 2 to other devices. For example, the interface 23 includes a communication interface for task instructor 2 to communicate by wired or wirelessly communication with other devices. The interface 23 performs an interface operation of the input unit 24a and the display unit 24b to the processor 21 and the memory 22. The input unit 24a is an interface configured to accept an input from a user, and examples of the input unit 24a include a touch panel, a button, a keyboard, and a voice input device. Examples of the display unit 24b include a display and a projector, and the display unit 24b displays information based on the display signal S2 under the control by the processor 21.

The hardware configuration of the task instruction device 2 is not limited to the configuration shown in FIG. 2B. For example, the input unit 24a and the display unit 24b may be configured by plural devices each electrically connected to the task instruction device 2. The task instruction device 2 may be connected to various devices such as a sound output device, a camera, or may incorporate these devices.

(3) Application Information

Next, a data structure of the application information stored in the application information storage unit 41 will be described.

Figure 3:
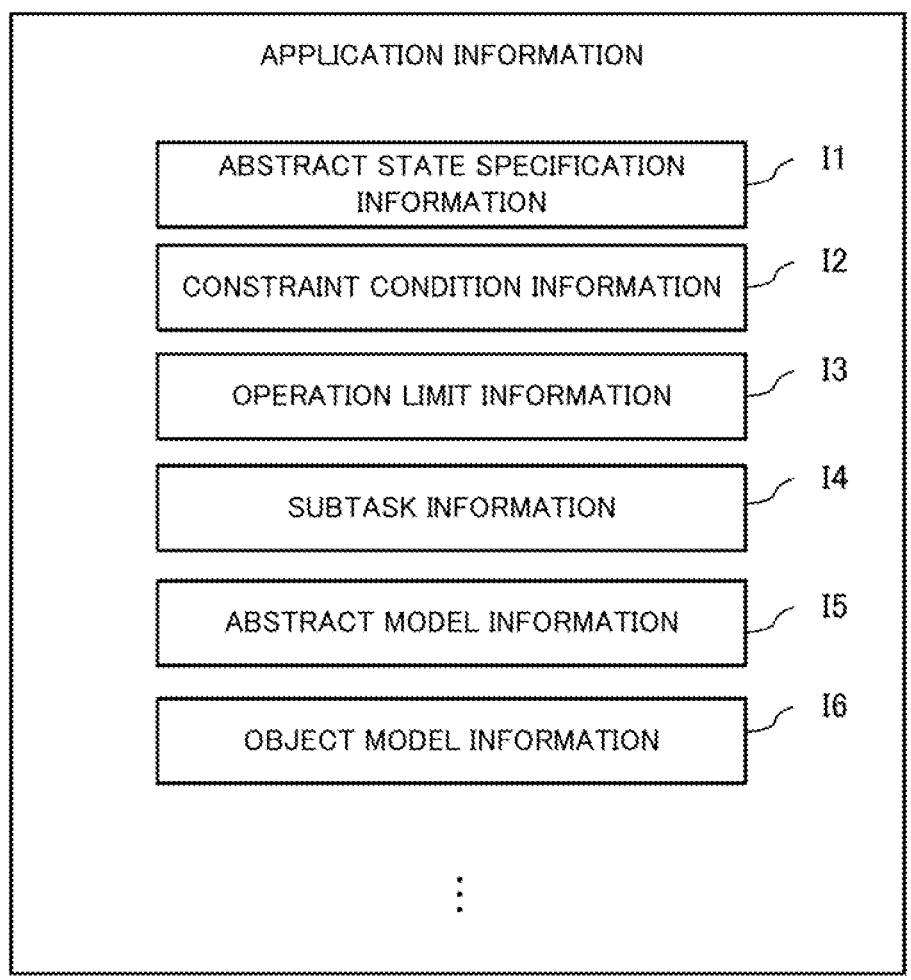
FIG. 3 illustrates an example of the data structure of application information.

FIG. 3 shows an example of a data structure of application information stored in the application information storage unit 41. As shown in FIG. 3, the application information storage unit 41 includes abstract state specification information I1, constraint condition information I2, operation limit information I3, subtask information I4, abstract model information I5, and object model information I6.

The abstract state specification information I1 specifies an abstract state to be defined in order to generate the subtask sequence. The above-mentioned abstract state is an abstract state of an object in the workspace, and is defined as a proposition to be used in the target logical formula to be described later. For example, the abstract state specification information I1 specifies the abstract state to be defined for each type of objective task.

The constraint condition information I2 indicates constraint conditions at the time of performing the objective task. The constraint condition information I2 indicates, for example, a constraint that the robot 5 (robot arms) must not be in contact with an obstacle when the objective task is pick-and-place, and a constraint that the robot arms must not be in contact with each other, and the like. The constraint condition information I2 may be information in which the constraint conditions suitable for each type of the objective task are recorded.

The operation limit information I3 indicates information on the operation limit of the robot 5 to be controlled by the control device 1. The operation limit information I3 is information, for example, defining the upper limits of the speed, the acceleration, and the angular velocity of the robot 5. It is noted that the operation limit information I3 may be information defining the operation limit for each movable portion or joint of the robot 5.

The subtask information I4 indicates information on subtasks that the robot 5 can accept. For example, when the objective task is pick-and-place, the subtask information I4 defines a subtask "reaching" that is the movement of a robot arm of the robot 5, and a subtask "grasping" that is the grasping by the robot arm. The subtask information I4 may indicate information on subtasks that can be used for each type of objective task.

The abstract model information I5 is information on an abstract model in which the dynamics in the workspace are abstracted. For example, an abstract model is represented by a model in which real dynamics are abstracted by a hybrid system, as will be described later. The abstract model Information I5 includes information indicative of the switching conditions of the dynamics in the above-mentioned hybrid system. For example, in the case of pick-and-place in which the robot 5 grasps a target object and then place it on a predetermined position, one of the switching conditions is that the target object cannot be moved unless it is gripped by the hand of the robot arm. The abstract model information I5 includes information on an abstract model suitable for each type of the objective task.

The object model information I6 is information on the object model of each object in the workspace to be recognized from the output signal S4 generated by the measurement device 7. Examples of the above-described each object include the robot 5, an obstacle, a tool and any other object handled by the robot 5, a working body other than the robot 5. The object model information I6 includes, for example, information required for the control device 1 to recognize the type, position, posture, currently-executed operation, and the like of the described above each object, and three-dimensional shape information such as CAD (Computer Aided Design) data for recognizing the three-dimensional shape of each object. The former information includes the parameters of an inference engine obtained by learning a learning model that is used in a machine learning such as a neural network. For example, the above-mentioned inference engine is preliminarily learned to output the type, the position, the posture, and the like of an object shown in the image when an image is inputted thereto.

In addition to the information described above, the application information storage unit 41 may store various kinds of information related to the generation process of the subtask sequence and the generation process of the display information S2.

(4) Process Overview by Control Device

Figure 4:
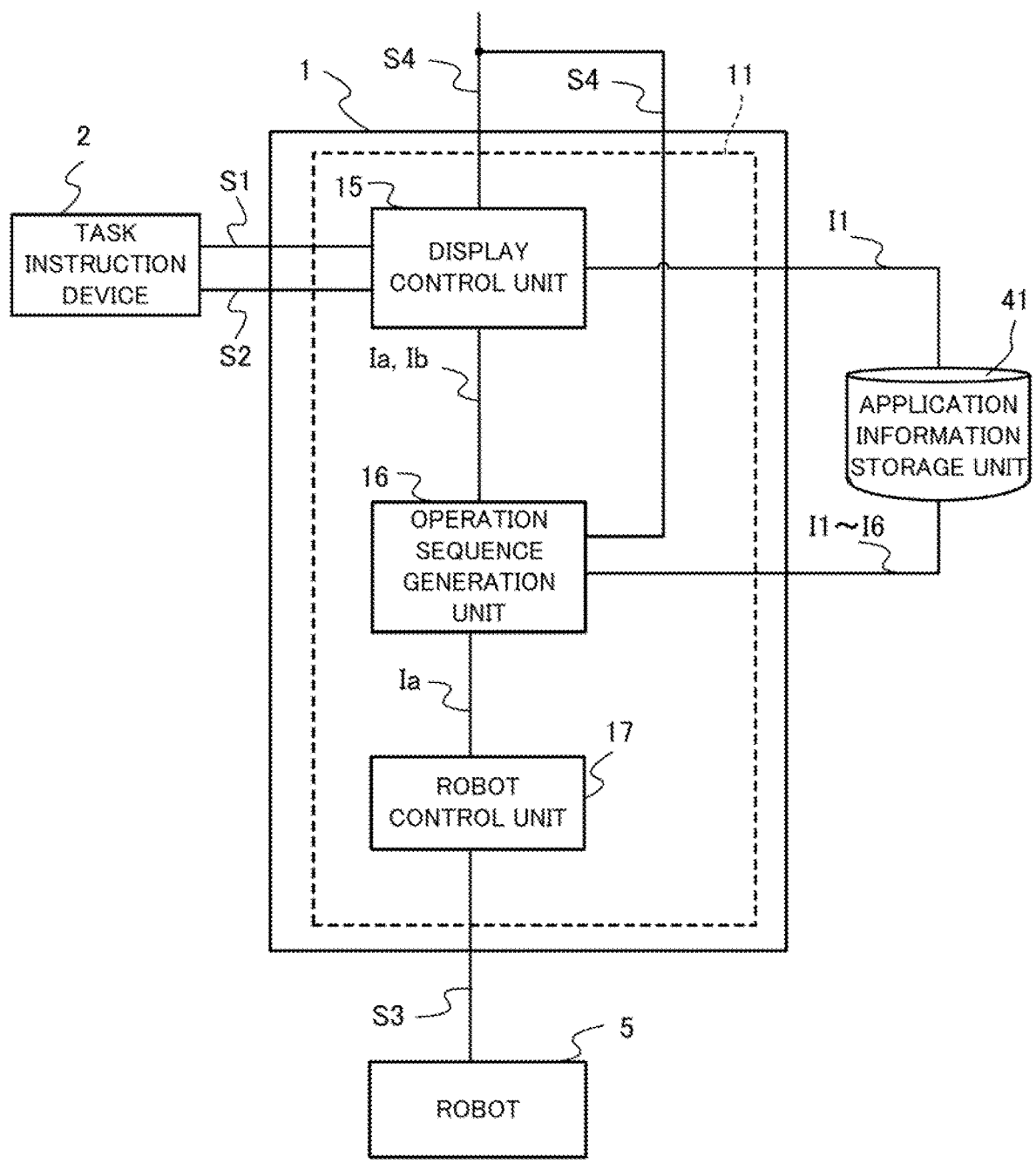
FIG. 4 is an example of a functional block of the control device.

FIG. 4 is an example of a functional block showing an outline of the process executed by the control device 1. The processor 11 of the control device 1 functionally includes a display control unit 15, an operation sequence generation unit 16, and a robot control unit 17. In FIG. 4, an example of data to be transmitted and received between the blocks is shown, but is not limited thereto. The same applies to the following diagrams illustrating other functional blocks.

The display control unit 15 generates display information S2 for displaying an input view (also referred to as "task input view") on which a worker specifies information on the objective task, and transmits the display information S2 to the task instruction device 2 via the interface 13. For example, the display control unit 15 displays an image (also referred to as "workspace image P") which is captured in the workspace and which is included in the output signal S4 on the task input view and receives an input based on various operations. Examples of operations described above include a touch operation, a drag-and-drop operation, a button operation, a keyboard operation, and a voice input operation.

The display control unit 15 receives, from the task instruction device 2 through the interface 13, the input information S1 which the task instruction device 2 has generated through the input operations on the task input view. In this case, the input information S1 includes information (also referred to as "task designation information Ia") that schematically specifies (designates) the objective task. The task designation information Ia is information corresponding to schematic instructions to the robot 5, and does not include information (e.g., information on a control input or information on subtasks to be described later) that specifies a specific operation to be executed by the robot 5. In addition to the task designation information Ia, the display information S2 may further include information (also referred to as "recognition assistance information Ib") that assists recognition of an object (including a specific portion of the object) related to the objective task. The task designation information Ia and recognition assistance information Ib will be described later. Then, the display control unit 15 supplies the operation sequence generation unit 16 with the task designation information Ia (and the recognition assistance information Ib) based on the input information S1 supplied from the task instruction device 2.

The operation sequence generation unit 16 generates a subtask sequence "Sr" to be executed by the robot 5 based on the task designation information Ia supplied from the display control unit 15, the recognition assistance information Ib, the output signal S4, and the application information stored in the storage device 4. Then, the operation sequence generation unit 16 supplies the generated subtask sequence Sr to the robot control unit 17. Here, the subtask sequence Sr includes information indicating the execution order and execution timing of each subtask.

The robot control unit 17 performs control for the robot 5 to execute each subtask included in the subtask sequence Sr at a predetermined execution timing (time step) on the basis of the subtask sequence Sr supplied from the operation sequence generation unit 16. Specifically, by transmitting the control signal S3 to the robot 5, the robot control unit 17 executes the position control or torque control of the joints of the robot 5 for realizing the subtask sequence Sr. Further, if a subtask sequence Sr is newly supplied from the operation sequence generation unit 16 during control of the robot 5 based on the preceding subtask sequence Sr, the robot control unit 17 performs operation control of the robot 5 based on the newly-supplied subtask sequence Sr.

The robot may be equipped with the function corresponding to the robot control unit 17 in place of the control device 1. In this case, the robot 5 receives the subtask sequence Sr from the operation sequence generation unit 16 and executes position control or torque control of the joints for realizing the subtask sequence Sr.

Each component of the display control unit 15, the operation sequence generation unit 16, and the robot control unit 17 described in FIG. 4 can be realized, for example, by the processor 11 executing the program. More specifically, each component may be implemented by the processor 11 executing a program stored in the memory 12 or the storage device 4. In addition, the necessary programs may be recorded in any nonvolatile recording medium and installed as necessary to realize each component. Each of these components is not limited to being implemented by software using a program, and may be implemented by any combination of hardware, firmware, and software. Each of these components may also be implemented using user programmable integrated circuit, such as, for example, FPGA (field-programmable gate array) or a microcomputer. In this case, the integrated circuit may be used to realize a program to function as each of the above-described components. Thus, each component may be implemented by hardware other than the processor. The above is the same in other example embodiments to be described later.

(5) Details of Display Control Unit

Details of the process executed by the display control unit 15 will be described. Hereinafter, display examples (the first display example to the third display example) of the task input view displayed by the task instruction device 2 under the control of the display control unit 15 will be described with reference to FIGS. 5 to 7.

Figure 5:
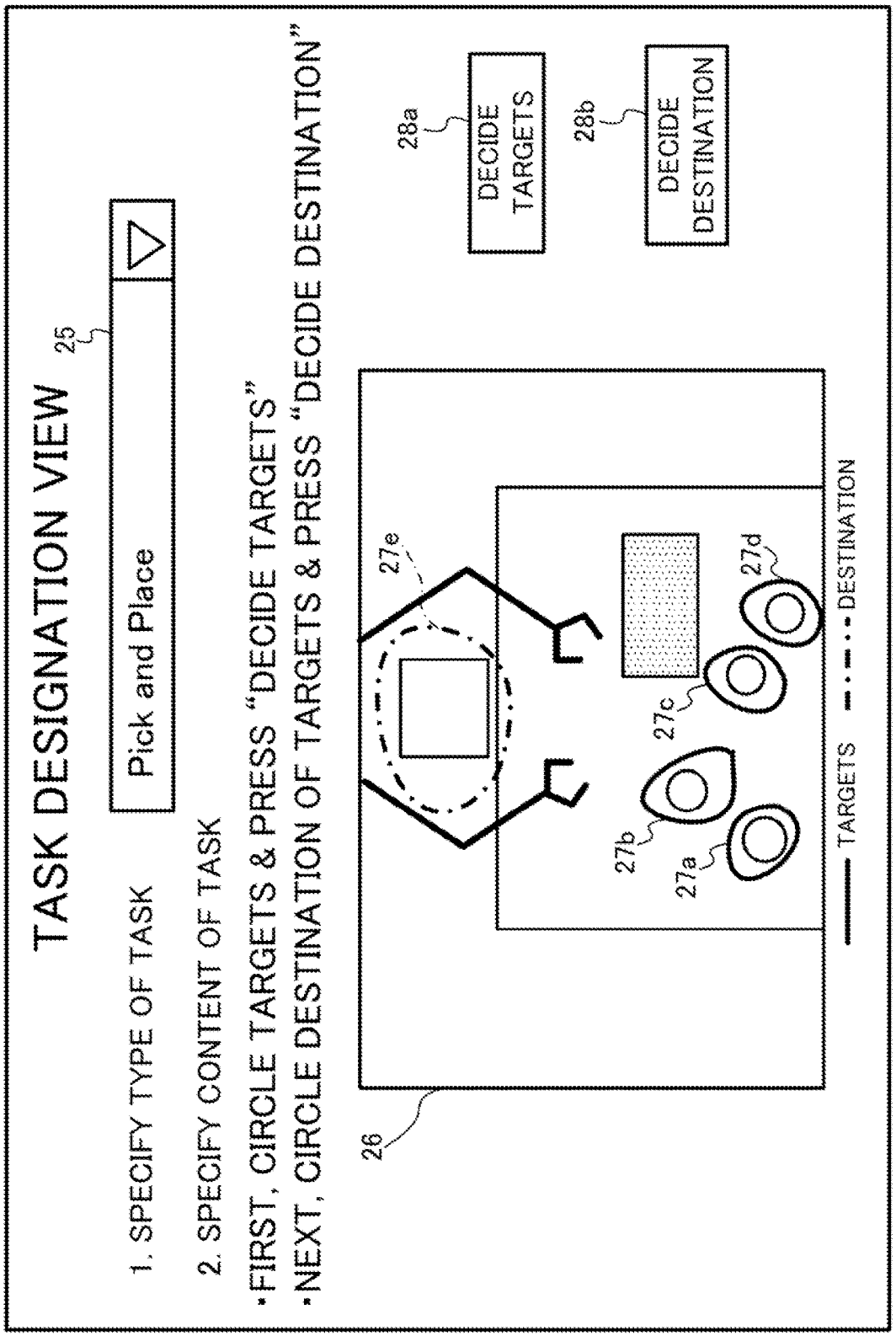
FIG. 5 is a first display example of the task input view.

FIG. 5 shows a first display example of a task input view. The display control unit 15 generates the display information S2 and transmits the display information S2 to the task instruction device 2 thereby to control the task instruction device 2 to display the task input view shown in FIG. 5. The task input view shown in FIG. 5 mainly includes a task type designation field 25, a workspace image display field 26, and various buttons 28 (28a, 28b).

The display control unit 15 receives an input for specifying the type of the objective task in the task type designation field 25. Here, as an example, the task type designation field 25 is an input field according to a pull-down menu format, and the display control unit 15 selectably displays a list of acceptable candidates of the type of the objective task in the task type designation field 25. In this case, pick-and-place is specified as the type of the objective task in the task type designation field 25.

Further, the display control unit 15 displays, in the workspace image display field 26, the workspace image P captured in the workspace by the measurement device 7, and accepts the designation necessary for execution of the objective task specified in the task type designation field 25. In this case, by referring to the abstract state specification information I1, the display control unit 15 specifies one or more objects whose abstract states need to be specified to execute the target objective task. Then, the display control unit 15 accepts an input for specifying the position of each specified object.

In the example shown in FIG. 5, the display control unit 15 refers to the abstract state specification information I1 corresponding to the pick-and-place selected in the task type designation field 25, and recognizes that it is necessary to determine one or more target objects (also referred to as "target objects") of the operation by the robot 5 and a destination of the target objects. Therefore, the display control unit 15 receives an input for specifying the target objects and the destination respectively on the workspace image display field 26. Here, the display control unit 15 displays on the task input view a guide sentence indicating that it is necessary to select the target object decision button 28*a* after circling each target object, and to select the destination decision button 28*b* after circling the destination. Then, when detecting the user's tracing operation on the workspace image display field 26 based on the input information S1, the display control unit 15 superimposes a mark along the traced position on the workspace image display field 26. Here, as an example, the display control unit 15 displays marks 27*a* to 27*d* by solid line for the target objects before selection of the object decision button 28*a*, and displays a mark 27*e* by broken line for the destination after the selection of the object decision button 28*a*.

When it is detected that the object decision button 28*a* has been selected, the display control unit 15 recognizes the position information of the marks 27*a* to 27*d* drawn by the user as information which specifies the positions of the target objects. Further, when it is detected that the destination decision button 28*b* has been selected, the display control unit 15 recognizes the position information of the mark 27*e* drawn by the user after the selection of the object decision button 28*a* as information which specifies the destination. Then, the display control unit 15 supplies the information (here, the position information of each mark on the workspace image P) which specifies these target objects and their destination to the operation sequence generation unit 16 as the task designation information Ia.

Instead of accepting an input for circling each target object and the destination, the display control unit 15 may accept, by touch operation or click operation, an input for specifying pixels corresponding to each target object and the destination, respectively. In this case, the display control unit 15 regards the position information indicative of each specified pixel as the information which specifies each target object and the destination, and supplies the information to the operation sequence generation unit 16 as the task designation information Ia.

It is noted that the contents (i.e., objects for which an abstract state needs to be specified) to be specified in the workspace image display field 26 is different depending on the type of the objective task specified in the task type designation field 25. Therefore, the display control unit 15 determines the layout of the task input view according to the type of the objective task specified in the task type designation field 25. For example, when assembly of a product is specified as the objective task, the display control unit 15 accepts an input for at least specifying parts to be assembled and tools on the workspace image display field 26. In this case, the display control unit 15 determines the guide sentences and the number of the buttons 28 and the notations thereof on the task input view according to the contents specified on the task input view.

As described above, according to the first display example of the task input view, the display control unit 15 suitably accepts the user input regarding the designation of the type of the objective task and the designation of objects related to the objective task thereby to acquire the task designation information Ia necessary for generating the subtask sequence Sr.

Figure 6:
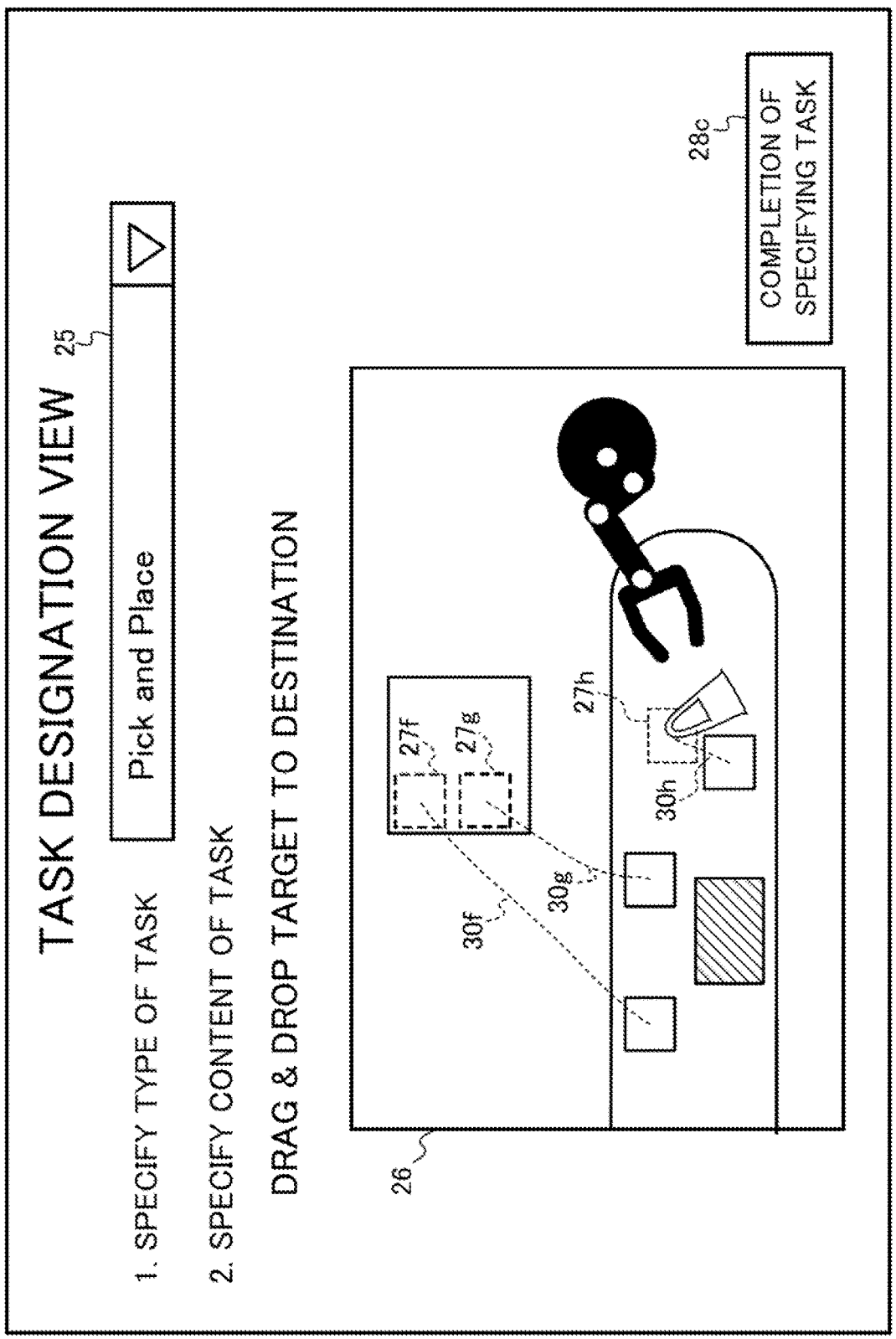
FIG. 6 is a second display example of the task input view.

FIG. 6 shows a second display example of a task input view. The second display example is different from the first display example in that it accepts the designation of the position of the target objects and the destination by a series of drag-and-drop operations instead of accepting the designation of the individual positions of the target objects and the destination.

In the second display example, the display control unit 15 displays, in the workspace image display field 26, the workspace image P which is captured in the workspace by the measurement device 7 and accepts the designation necessary for the execution of the objective task that was specified in the task type designation field 25. In this case, since pick-and-place is selected in the task type designation field 25, the display control unit 15 refers to the abstract state specification information I1 and determines that it is necessary to determine target objects and the destination of the target objects. Thereafter, when detecting the drag-and-drop operation on the workspace image display field 26, the display control unit 15 regards an object existing at the start point position of the drag-and-drop operation as a target object and considers the end point position of the drag-and-drop operation as its destination.

In the example shown in FIG. 6, the dragging trajectories by the drag-and-drop operation are indicated by dashed lines 30*f* to 30*h*, and the positions of the target objects moved by drag-and-drop operation are indicated by dashed frames 27*f* to 27*h*. The display control unit 15 may actually display the broken frames 27*f* to 27*h* on the workspace image display field 26 by specifying the area of each target object including the start point position of the drag-and-drop operation. When detecting that the task designation completion button 28*c* has been selected, the display control unit 15 acquires the input information S1 indicating the start point position and end point position of the drag-and-drop operation on the workspace image P as the task designation information Ia indicating the position of each target object.

As described above, according to the second display example of the task input view, in the same way as in the first display example, the display control unit 15 accepts the user input relating to the designation of the type of the objective task and the designation of necessary objects thereby to suitably acquire the task designation information Ia necessary for generating the subtask sequence Sr.

Figure 7:
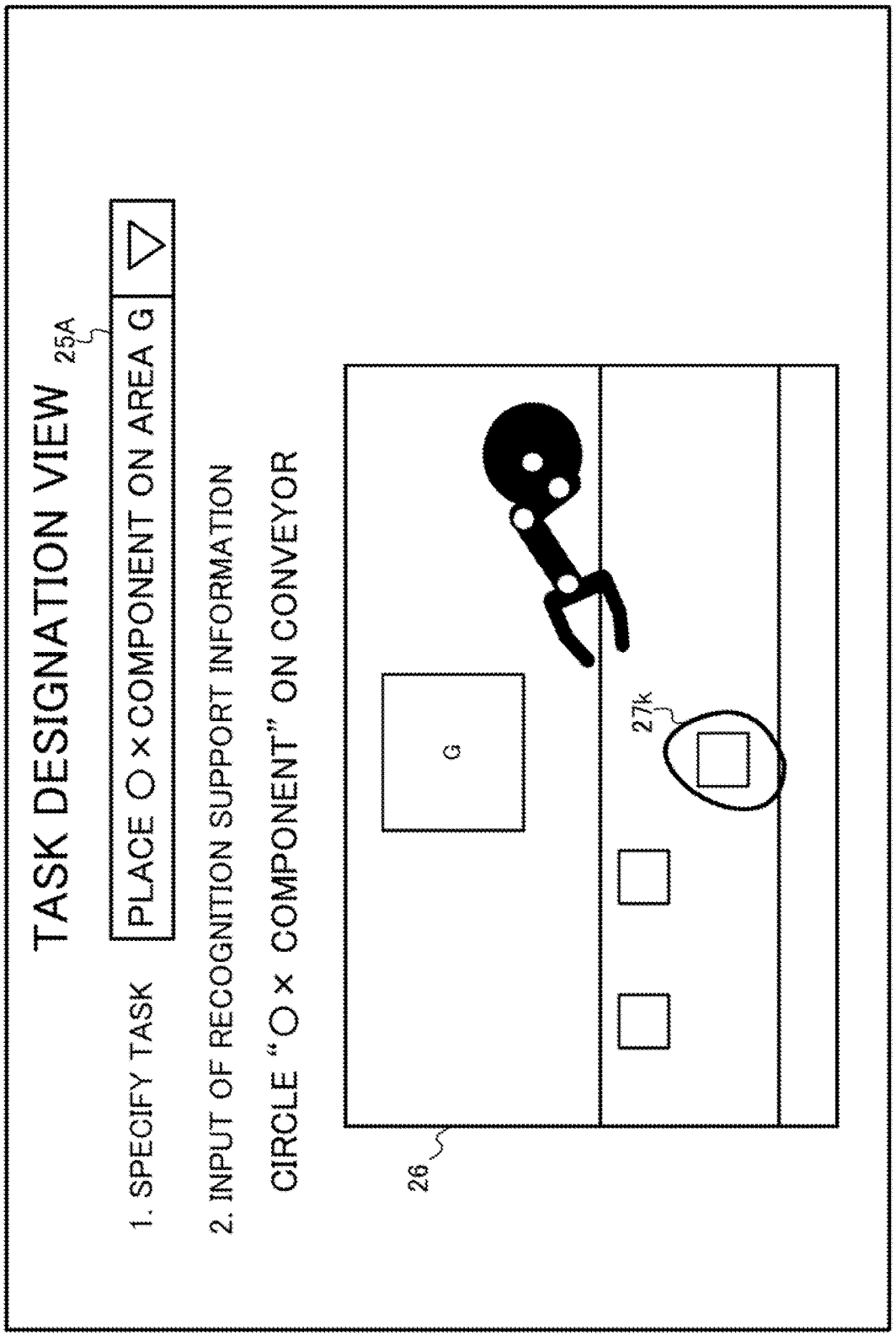
FIG. 7 is a third display example of the task input view.

FIG. 7 shows a third display example of the task input view. The third display example is different from the first and second display examples in that the display control unit 15 acquires the input information S1 corresponding to the recognition assistance information Ib.

In the third display example, the display control unit 15 displays, on the task input view, a task designation field 25A in which the more detailed content of the task is specified than in the task type designation field 25 according to the first display example and the second display example. Specifically, in the case of pick-and-place, the display control unit 15 provides the task designation field 25A in which a combination of target objects and the destination can be selected in a pull-down menu format on the task input view. In the third display example, an item indicating "○×component" as a target object and "area G" as the destination is selected in the task designation field 25A. Information relating to "○×component" and "area G" is registered in advance in the application information as the object model information I6. Then, the display control unit 15 supplies, based on the selection result in the task designation field 25A, the operation sequence generation unit 16 with the task designation information Ia specifying "○×component" as a target object and "area G" as the destination.

Further, the display control unit 15 provides, on the task input view, the workspace image display field 26 which displays the workspace image P in which the robot 5 disposed near the conveyor is captured. Here, the conveyor is in operation and an object is conveyed to the right at a predetermined speed by the conveyor. Then, the display control unit 15 displays, on the task input view, a guide sentence prompting a user to circle the object on the conveyor corresponding to the target object "○×component" to be picked up.

Then, when detecting that the mark 27k that is a circle is drawn on the workspace image display field 26, the display control unit 15 recognizes that the area surrounded by the mark 27k is an area including "○×component". Therefore, the display control unit 15 supplies the recognition assistance information Ib that is the position information of the mark 27k on the workspace image P to the operation sequence generation unit 16. Thereafter, the operation sequence generation unit 16 identifies the object present in the area surrounded by the mark 27k as "○×component" and sets the abstract state to be described later. In this case, the recognition assistance information Ib is information for suitably assisting the recognition process of the target object by the operation sequence generation unit 16. The operation sequence generation unit 16 detects, regardless of the presence or absence of the recognition assistance information Ib, the target object "○×component" in the workspace image P. Then, when detecting the object to be estimated as "○×component", the operation sequence generation unit 16 regards the object as "○×component" and sets the abstract state regarding the object.

Further, new target objects "○×component" are conveyed by the operation of the conveyor in the working range of the robot 5 one after another. Therefore, the display control unit 15 displays the latest workspace image P generated by the measurement device 7 in the workspace image display field 26. The user of the task instruction device 2 performs an input in a sequential way for circling a target object shown in the image in the workspace image display field 26. In this case, the display control unit 15 supplies the task designation information Ia and the recognition assistance information Ib based on the newly generated input information S1 to the operation sequence generation unit 16. The operation sequence generation unit 16 generates a new subtask sequence Sr for the robot 5 to carry the new target object shown in the image in the workspace image display field 26 to the area G.

As described above, according to the third display example of the task input view, the display control unit 15 accepts a user input that assists the recognition of an object related to the objective task in addition to the user input that specifies the objective task. Thus, the operation sequence generation unit 16 suitably acquires the task designation information Ia necessary for generating the subtask sequence Sr and appropriately acquires the recognition assistance information Ib for performing the recognition of the object related to the objective task with high accuracy.

It is noted that, since the task instruction device 2 and the control device 1 exchanges information via the communication network 3 in which the communication quality is not guaranteed, a time difference may occur between the time when the mark 27k is inputted and the time when the operation sequence generation unit 16 acquires the recognition assistance information Ib relating to the mark 27k. In this case, when the operation sequence generation unit 16 acquires the recognition assistance information Ib relating to the mark 27k, there can occur the deviation between the position of the target object "○×component" and the mark 27k due to the movement of the target object by the conveyor by the distance corresponding to the above-mentioned time difference.

The above things considered, the operation sequence generation unit 16 may correct the recognition assistance information Ib in consideration of the communication delay due to the communication network 3. For example, based on the workspace images P obtained in time series, the operation sequence generation unit 16 calculates the moving direction and the moving speed (so-called optical flow) of an object existing on the conveyor, and corrects the position of the mark 27k based on the calculation result and the assumed communication delay time. Thus, the operation sequence generation unit 16 can recognize target objects accurately based on the recognition assistance information Ib even under an environment where communication delay occurs.

It is noted that, in the first display example and the second display example, information for specifying a target object and the destination (e.g., information indicative of the type of the target object and position information of the destination) may be included in advance in the object model information I6 in the application information. In this case, the display control unit 15 supplies the position information of the target object and the destination specified on the workspace image display field 26 to the operation sequence generation unit 16 as the recognition assistance information Ib. Even in this case, the operation sequence generation unit 16 suitably limits the range for detecting each target object and the destination based on the recognition assistance information Ib, thereby recognizing each target object and the destination with high accuracy.

Further, the recognition assistance information Ib may be information that specifies the portion of the target object to be grasped by the robot 5. In this case, on the task input view, the display control unit 15 accepts the input of the mark specifying the portion of the target object to be grasped by the robot 5, and supplies the position information of the mark to the operation sequence generation unit 16 as the recognition assistance information Ib.

(6) Details of Operation Sequence Generation Unit

Next, detailed process of the operation sequence generation unit 16 will be described.

(6-1) Functional Block

Figure 8:
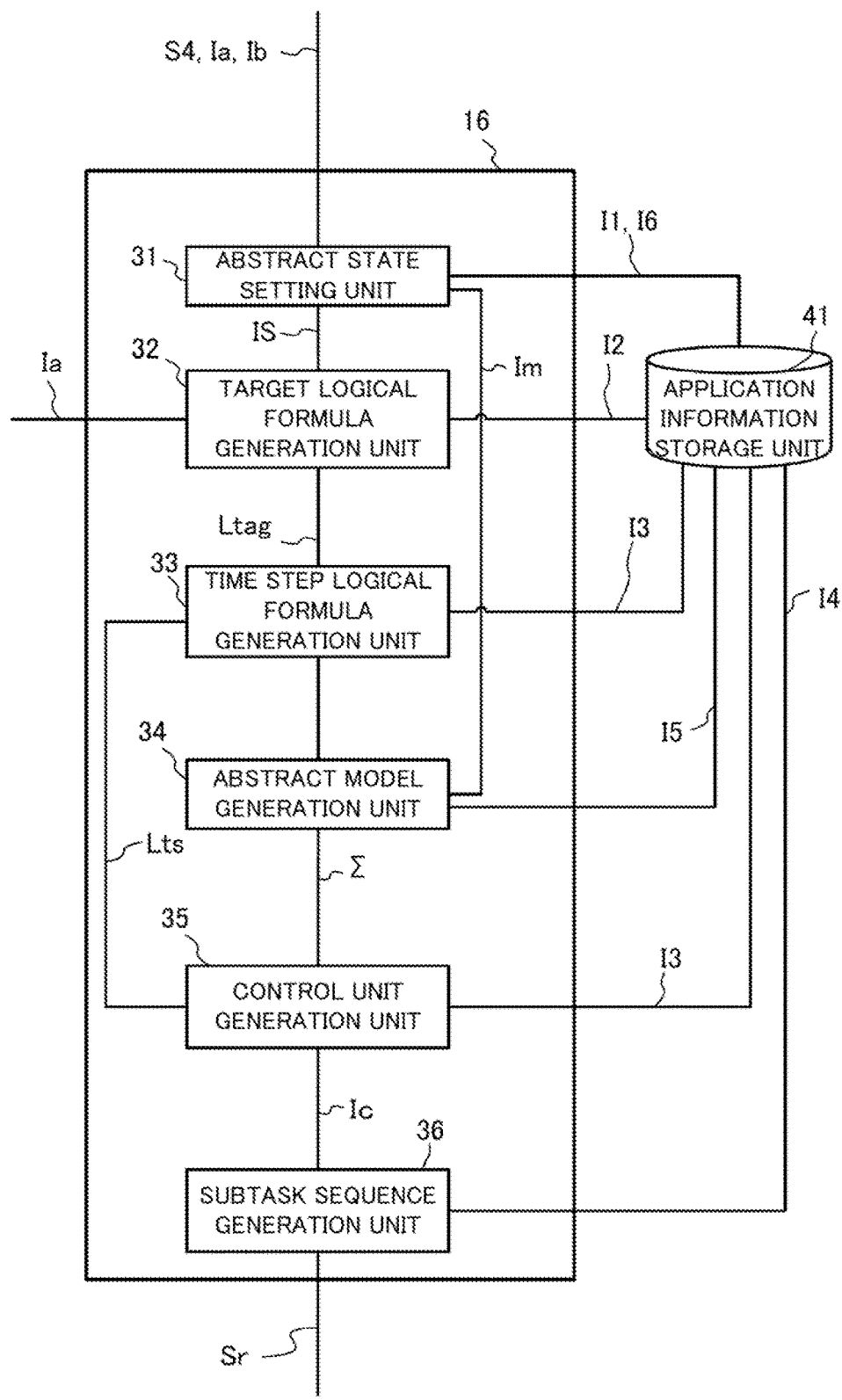
FIG. 8 is an example of a functional block of the operation sequence generation unit.

FIG. 8 is an example of a functional block showing the functional configuration of the operation sequence generation unit 16. The operation sequence generation unit 16 functionally includes an abstract state setting unit 31, a target logical formula generation unit 32, a time step logical formula generation unit 33, an abstract model generation unit 34, a control input generation unit 35, and a subtask sequence generation unit 36.

The abstract state setting unit 31 sets an abstract state in the workspace on the basis of: the output signal S4 supplied from the measurement device 7; the task designation information Ia supplied from the display control unit 15; the recognition assistance information Ib; the abstract state specification information I1; and the object model information I6. In this case, the abstract state setting unit 31 recognizes objects present in the workspace that needs to be considered when executing the objective task, and generates the recognition result Im relating to the objects. Based on the recognition result Im, the abstract state setting unit 31 defines a proposition, for each abstract state that needs to be considered when executing the objective task, to be expressed in a logical formula. The abstract state setting unit 31 supplies information (also referred to as "abstract state setting information IS") indicating the abstract state to the target logical formula generation unit 32.

On the basis of the abstract state setting information IS, the target logical formula generation unit 32 converts the objective task indicated by the input signal S1 into a logical formula (also referred to as a "target logical formula Ltag"), in the form of the temporal logic, representing the final state to be achieved. In this case, by referring to the constraint condition information I2 from the application information storage unit 41, the target logical formula generation unit 32 adds the constraint conditions to be satisfied in executing the objective task to the target logical formula Ltag. Then, the target logical formula generation unit 32 supplies the generated target logical formula Ltag to the time step logical formula generation unit 33. Further, the target logical formula generation unit 32 generates a display signal S2 for displaying a view for receiving an input relating to the objective task, and supplies the display signal S2 to the task instruction device 2.

The time step logical formula generation unit 33 converts the target logical formula Ltag supplied from the target logical formula generation unit 32 to the logical formula (also referred to as "time step logical formula Lts") representing the state at each time step. Then, the time step logical formula generation unit 33 supplies the generated time step logical formula Lts to the control input generation unit 35.

The abstract model generation unit 34 generates an abstract model "Σ" in which the real dynamics in the workspace are abstracted, based on the recognition result Im supplied from the abstract state setting unit 31 and the abstract model information I5 stored in the application information storage unit 41. In this case, the abstract model generation unit 34 considers the target dynamics as a hybrid system in which the continuous dynamics and the discrete dynamics are mixed, and generates the abstract model Σ based on the hybrid system. The method for generating the abstract model Σ will be described later. The abstract model generation unit 34 supplies the generated abstract model Σ to the control input generation unit 35.

The control input generation unit 35 determines a control input to the robot 5 for each time step so that the time step logic formula Lts supplied from the time step logical formula generation unit 33 and the abstract model Σ supplied from the abstract model generation unit 34 are satisfied and so that the evaluation function (e.g., a function representing the amount of energy consumed by the robot) is optimized. Then, the control input generation unit 35 supplies information (also referred to as "control input information Ic") indicating the control input to the robot 5 for each time step to the subtask sequence generation unit 36.

The subtask sequence generation unit 36 generates a subtask sequence Sr based on the control input information Ic supplied from the control input generation unit 35 and the subtask information I4 stored in the application information storage unit 41, and supplies the subtask sequence Sr to the robot control unit 17.

(6-2) Abstract State Setting Unit

First, the abstract state setting unit 31 generates the recognition result Im by analyzing, with reference to the object model information I6, the output signal S4 according to a technique (e.g., an image processing technique, an image recognition technique, a speech recognition technique, and a technique using RFID (Radio Frequency Identifier)) of recognizing the environment of the workspace. In this case, when the recognition assistance information Ib is supplied from the operation sequence generation unit 16, the abstract state setting unit 31 limits the existence range of the objects to be recognized based on the recognition assistance information Ib thereby to recognize the objects with high accuracy. The recognition result Im includes information indicative of the type, position, and posture of each of the objects present in the workspace. Examples of the objects present in the workspace include the robot 5, target objects such as tools or parts handled by the robot 5, obstacles and other working bodies.

The abstract state setting unit 31 sets abstract states in the workspace based on the recognition result Im and the abstract state specification information I1 acquired from the application information storage unit 41. In this case, the abstract state setting unit 31 refers to the abstract state specification information I1 and recognizes an abstract state to be set in the workspace. The abstract state to be set in the workspace varies depending on the type of the objective task. Therefore, when the abstract state to be set is defined for each type of the objective task in the abstract state specification information I1, the abstract state setting unit 31 refers to the abstract state specification information I1 corresponding to the objective task specified by the task instruction information Ia and recognizes the abstract state to be set.

Figure 9:
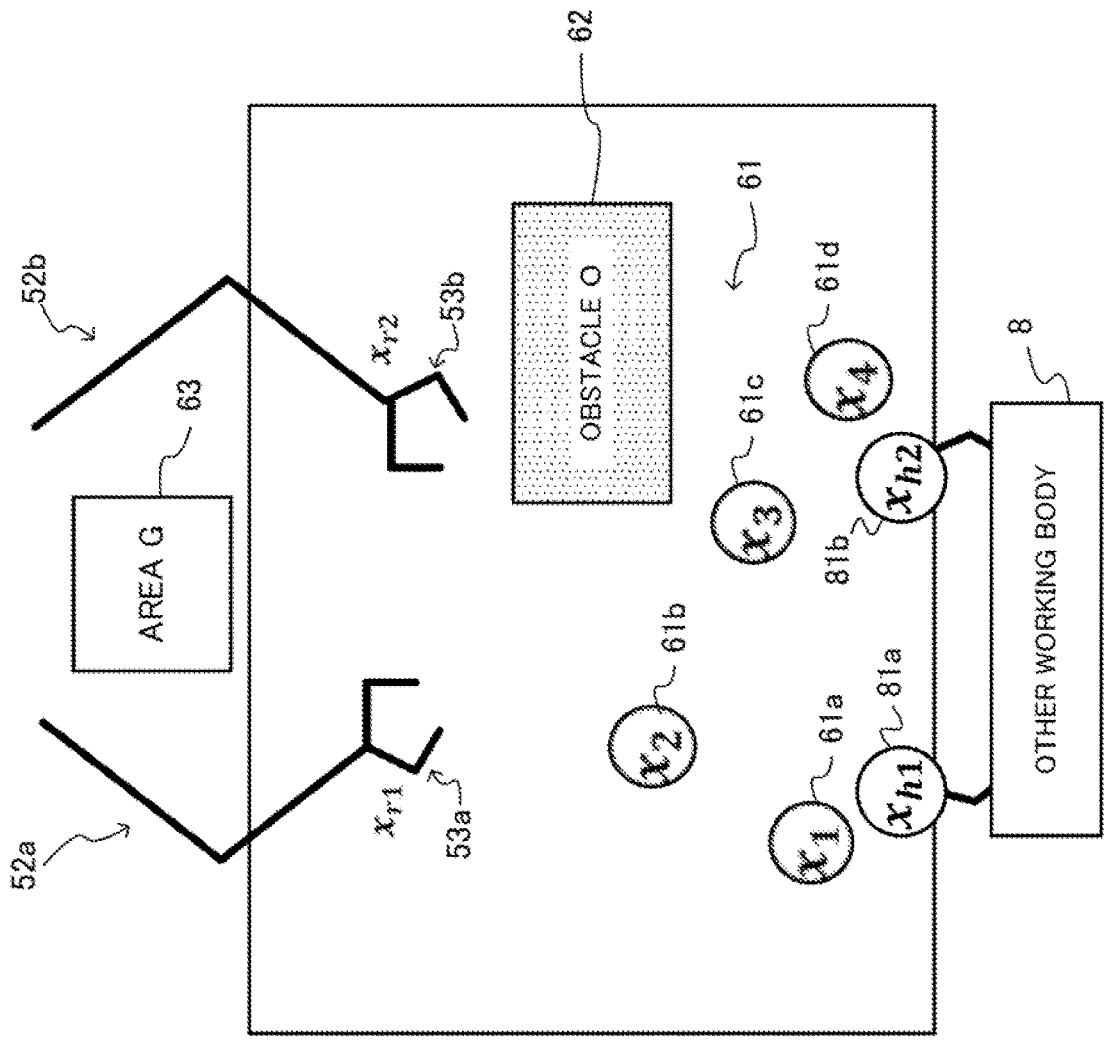
FIG. 9 illustrates a bird's-eye view of the workspace in a case that the objective task is pick-and-place.

FIG. 9 shows a bird's-eye view of the workspace in a case that the objective task is pick-and-place. In the workspace shown in FIG. 9, there are two robot arms 52a and 52b, four target objects 61 (61a to 61d), an obstacle 62, another working body 8 having other working body hands 81 (81a and 81b), and the area G that is the destination of the target objects 61.

In this case, first, the abstract state setting unit 31 recognizes the state of the target objects 61, the existence range of the obstacle 62, the state of the other working body 8, the existence range of the area G and the like.

Here, the abstract state setting unit 31 recognizes the position vectors "$x_1$" to "$x_4$" corresponding to the centers of the target objects 61a to 61d as the positions of the target objects 61a to 61d. Further, the abstract state setting unit 31 recognizes the position vector "$x_{r1}$" of the robot hand 53a for grasping a target object and the position vector "$x_{r2}$" of the robot hand 53b for grasping a target object as the positions of the robot arm 52a and the robot arm 52b, respectively.

Further, the abstract state setting unit 31 recognizes the position vector "$x_{h1}$" of the other working body hand 81*a*, which is one hand of the other working body 8, and the position vector "$x_{h2}$" of the other working body hand 81*b*, which is the other hand of the other working body 8, as the positions of the feature points relating to various operations by the other working body 8 such as grabbing, releasing, and moving the target object. The abstract state setting unit 31 may determine the other working body hand 81*a* and the other working body hand 81*b* to be two other working bodies 8 independent from each other. In this case, the abstract state setting unit 31 recognizes the positions of the other working body hand 81*a* and the other working body hand 81*b* as the positions of the other working bodies 8.

Similarly, the abstract state setting unit 31 recognizes the postures of the target objects 61*a* to 61*d* (it is unnecessary in the example of FIG. 9 because each target object is spherical), the existence range of the obstacle 62, the existence range of the area G, and the like. For example, when assuming that the obstacle 62 is a rectangular parallelepiped and the area G is a rectangle, the abstract state setting unit 31 recognizes the position vector of each vertex of the obstacle 62 and the area G.

The abstract state setting unit 31 determines each abstract state to be defined in the objective task by referring to the abstract state specification information I1. In this case, the abstract state setting unit 31 determines a proposition indicating the each abstract state on the basis of the recognition result Im (e.g., the number of objects for each type) relating to objects present in the workspace and the abstract state specification information I1.

In the example shown in FIG. 9, the abstract state setting unit 31 assigns identification labels "1" to "4" to the target objects 61*a* to 61*d* specified by the recognition result Im, respectively. Further, the abstract state setting unit 31 defines a proposition "$g_i$" that the target object "i" (i=1 to 4) is present in the area G that is the goal point to be finally placed. Further, the abstract state setting unit 31 defines an identification label "O" to the obstacle 62, and defines the proposition "$o_i$" that the target object i interferes with the obstacle O. Furthermore, the abstract state setting unit 31 defines a proposition "h" that a robot arm 52 interferes with another robot arm 52. Similarly, the abstract state setting unit 31 defines a proposition that a robot arm 52 interferes with any of other working body hands 81*a* and 81*b*.

In this way, by referring to the abstract state specification information I1, the abstract state setting unit 31 recognizes the abstract state to be defined, and defines the propositions ($g_i$, $o_i$, h in the above-described example) representing the abstract state according to the number of the target objects 61, the number of the robot arms 52, the number of the obstacles 62, the number of the other working bodies 8 and the like. The abstract state setting unit 31 supplies the target logical formula generation unit 32 with the abstract state setting information IS which includes the information indicative of the propositions representing the abstract state.

(6-3) Target Logical Formula Generation Unit

The target logical formula generation unit 32 converts the objective task specified by the input signal S1 into a logical formula using a temporal logic. The input signal S1 may be represented by use of a natural language. There are various existing technologies for the method of converting tasks expressed in natural language into logical formulas. For example, in the example of FIG. 9, it is herein assumed that the objective task "the target object (i=2) is finally present in the area G" is given. In this case, the target logical formula generation unit 32 generates the logical formula "$\Diamond g_2$" which represents the objective task by using the operator "$\Diamond$" corresponding to "eventually" of the linear logical formula (LTL: Linear Temporal Logic) and the proposition "$g_i$" defined by the abstract state setting unit 31. The target logical formula generation unit 32 may express the logical formula by using any operators based on the temporal logic other than the operator "$\Diamond$" such as logical AND "$\land$", logical OR "$\lor$", negative "$\neg$", logical implication "$\Rightarrow$", always "$\Box$", next "$\bigcirc$", until "U", etc.). The logical formula may be expressed by any temporal logic other than linear temporal logic such as MTL (Metric Temporal Logic) and STL (Signal Temporal Logic).

Next, the target logical formula generation unit 32 generates the target logical formula Ltag obtained by adding the constraint conditions indicated by the constraint condition information I2 to the logical formula indicating the objective task.

For example, provided that two constraint conditions "the robot arms 52 always does not interfere with each other" and "the target object i always does not interfere with the obstacle O" for pick-and-place are included in the constraint condition information I2 as the constraint conditions for the pick-and-place shown in FIG. 9, the target logical formula generation unit 32 converts these constraint conditions into logical formulas. Specifically, the constraint target logical formula generation unit 32 converts the above-described two constraint conditions into the following logical formulas by using the proposition "$o_i$" and the proposition "h" defined by the abstract state setting unit 31 according to the description relating to FIG. 9.

$$\Box \neg h$$

$$\land_i \Box \neg o_i$$

Therefore, in this case, the target logical formula generation unit 32 generates the following target logical formula Ltag obtained by adding the logical formulas of these constraint conditions to the logical formula "$\Diamond g_2$" corresponding to the objective task "the target object (i=2) is eventually present in the area G".

$$(\Diamond g_2) \land (\Box \neg h) \land (\land_i \Box \neg o_i)$$

In practice, the constraint conditions corresponding to the pick-and-place are not limited to the above-described two constraint conditions and there are other constraint conditions such as "a robot arm 52 always does not interfere with the obstacle O", "plural robot arms 52 do not grasp the same target object", "target objects does not contact with each other", and "a robot arm 52 does not interfere with any of the other working body hands 81*a* and 81*b*". Such constraint conditions are also stored in the constraint condition information I2 and are reflected in the target logical formula Ltag.

(6-4) Time Step Logical Formula Generation Unit

The time step logical formula generation unit 33 determines the number of time steps (also referred to as the "target time step number") for completing the objective task, and determines combinations of propositions representing the state at each time step such that the target logical formula Ltag is satisfied with the target time step number. Since the combinations are normally plural, the time step logical formula generation unit 33 generates a logical formula obtained by combining these combinations by logical OR as the time step logical formula Lts. Each of the combinations described above is a candidate of a logical formula representing a sequence of operations to be instructed to the robot 5, and therefore it is hereinafter also referred to as "candidate φ".

Here, a description will be given of a specific example of the processing executed by the time step logical formula generation unit 33 when the objective task "the target object (i=2) eventually exists in the area G" is set according to the description relating to FIG. 9.

In this case, the following target logical formula Ltag is supplied from the target logical formula generation unit 32 to the time step logical formula generation unit 33.

$$(\Diamond g_2) \wedge (\Box \neg h) \wedge (\wedge_i \Box \neg o_i)$$

In this case, the time-step logical formula generation unit 33 uses the proposition "$g_{i,k}$" that is the extended proposition "$g_i$" to include the concept of time steps. Here, the proposition "$g_{i,k}$" is the proposition that the target object i exists in the area G at the time step k. Here, when the target time step number is set to "3", the target logical formula Ltag is rewritten as follows.

$$(\Diamond g_{2,3}) \wedge (\wedge_{k=1,2,3} \Box \neg h_k) \wedge (\wedge_{i,k=1,2,3} \Box \neg o_i)$$

$\Diamond g_{2,3}$ can be rewritten as shown in the following expression.

$$\Diamond g_{2,3} = (\neg g_{2,1} \wedge \neg g_{2,2} \wedge g_{2,3}) \vee$$

$$(\neg g_{2,1} \wedge g_{2,2} \wedge g_{2,3}) \vee (g_{2,1} \wedge \neg g_{2,2} \wedge g_{2,3}) \vee (g_{2,1} \wedge g_{2,2} \wedge g_{2,3})$$

The target logical formula Ltag described above is represented by a logical OR($\varphi_1 \vee \varphi_2 \vee \varphi_3 \vee \varphi_4$) of four candidates "$\varphi_1$" to "$\varphi_4$" as shown in below.

$$\phi_1 = (\neg g_{2,1} \wedge \neg g_{2,2} \wedge g_{2,3}) \wedge (\wedge_{k=1,2,3} \Box \neg h_k) \wedge (\wedge_{i,k=1,2,3} \Box \neg o_{i,k})$$

$$\phi_2 = (\neg g_{2,1} \wedge g_{2,2} \wedge g_{2,3}) \wedge (\wedge_{k=1,2,3} \Box \neg h_k) \wedge (\wedge_{i,k=1,2,3} \Box \neg o_{i,k})$$

$$\phi_3 = (g_{2,1} \wedge \neg g_{2,2} \wedge g_{2,3}) \wedge (\wedge_{k=1,2,3} \Box \neg h_k) \wedge (\wedge_{i,k=1,2,3} \Box \neg o_{i,k})$$

$$\phi_4 = (g_{2,1} \wedge g_{2,2} \wedge g_{2,3}) \wedge (\wedge_{k=1,2,3} \Box \neg h_k) \wedge (\wedge_{i,k=1,2,3} \Box \neg o_{i,k})$$

Therefore, the time-step logical formula generation unit 33 defines the logical OR of the four candidates $\varphi_1$ to $\varphi_4$ as the time-step logical formula Lts. In this case, the time step logical formula Lts is true if at least one of the four candidates $\varphi_1$ to $\varphi_4$ is true.

Next, a supplementary description will be given of a method for setting the number of target time steps.

For example, the time step logical formula generation unit 33 determines the target time step number based on the prospective (expected) work time specified by the input information S1 supplied from the task instruction device 2. In this case, the time step logical formula generation unit 33 calculates the target time step number based on the prospective work time described above and the information on the time width per time step stored in the memory 12 or the storage device 4. In another example, the time step logical formula generation unit 33 stores, in advance in the memory 12 or the storage device 4, information in which a suitable target time step number is associated with each type of objective task, and determines the target time step number in accordance with the type of objective task to be executed by referring to the information.

In some embodiments, the time step logical formula generation unit 33 sets the target time step number to a predetermined initial value. Then, the time step logical formula generation unit 33 gradually increases the target time step number until the time step logical formula Lts with which the control input generation unit 35 can determine the control input is generated. In this case, if the control input generation unit 35 ends up not being able to derive the optimal solution in the optimization process with the set target time step number, the time step logical formula generation unit 33 add a predetermined number (1 or more integers) to the target time step number.

At this time, the time step logical formula generation unit 33 may set the initial value of the target time step number to a value smaller than the number of time steps corresponding to the work time of the objective task expected by the user. Thus, the time step logical formula generation unit 33 suitably suppresses setting the unnecessarily large target time step number.

(6-5) Abstract Model Generation Unit

The abstract model generation unit 34 generates the abstract model $\Sigma$ based on the abstract model information I5 and the recognition result Im. Here, the information necessary for generating the abstract model $\Sigma$ is recorded in the abstract model information I5 for each type of the objective task. For example, when the objective task is pick-and-place, an abstract model in a general format that does not specify the position or number of the target objects, the position of the area where the object is placed, the number of robots 5 (or the number of robot arms 52), and the like is recorded in the abstract model information I5. Then, the abstract model generation unit 34 generates the abstract model $\Sigma$ by reflecting the recognition result R in the abstract model in the general format including the dynamics of the robot 5 recorded in the abstract model information I5. Thus, the abstract model $\Sigma$ becomes a model in which the state of objects present in the workspace and the dynamics of the robot 5 are abstractly represented. The state of the objects present in the workspace indicates the position and number of the target objects, the position of the area where the target object is placed, the number of robots 5 and the like in the case of pick-and-place. If one or more other working bodies is present, information on the abstracted dynamics of the other working bodies may be included in the abstract model information I5. In this case, the abstract model $\Sigma$ becomes a model in which the state of an object in the workspace, the dynamics of the robot 5, and the dynamics of the other working bodies are abstractly represented.

Here, at the time of work of the objective task by the robot 5, the dynamics in the workspace is frequently switched. For example, in the case of pick-and-place, while the robot arm 52 is gripping the target object i, the target object i can be moved. However, if the robot arm 52 is not gripping the target object i, the target object i cannot be moved.

In view of the above, in the present example embodiment, in the case of pick-and-place, the operation of grasping the target object i is abstracted by the logical variable "$\delta_i$". In this case, for example, the abstract model generation unit 34 can define the abstract model $\Sigma$ to be set for the workspace shown in FIG. 9 as the following equation (1).

$$\begin{bmatrix} x_{r1} \\ x_{r2} \\ x_1 \\ \vdots \\ x_4 \\ x_{h1} \\ x_{h2} \end{bmatrix}_{k+1} = [IA] \begin{bmatrix} x_{r1} \\ x_{r2} \\ x_1 \\ \vdots \\ x_4 \\ x_{h1} \\ x_{h2} \end{bmatrix}_k + \begin{bmatrix} I & 0 \\ 0 & I \\ \delta_{1,1}I & \delta_{2,1}I \\ \vdots & \vdots \\ \delta_{1,4}I & \delta_{2,4}I \\ O & \end{bmatrix} \begin{bmatrix} u_1 \\ u_2 \end{bmatrix} \quad (1)$$

$$h_{ij_{min}}(1 - \delta_i) \leq h_{ij}(x) \leq h_{ij_{max}} \delta_i + (\delta_i - 1)\varepsilon$$

Here, "$u_j$" indicates a control input for controlling the robot hand j ("j=1" is the robot hand 53a, "j=2" is the robot hand 53b), and "I" indicates a unit matrix. "0" indicates a zero matrix. "A" is a drift term representing the dynamics of the other working body hands 81 of the other working body 8. It is herein assumed that the control input is a speed as an example, but it may be an acceleration. Further, "$\delta_{j,i}$" is a logical variable that is set to "1" when the robot hand j grasps the target object i and is set to "0" in other cases. Each of "$x_{r1}$" and "$x_{r2}$" indicates the position vector of the robot hand j (j=1, 2), each of "$x_1$" to "$x_4$" indicates the position vector of the target object i (i=1 to 4), and "$x_{h1}$" and "$x_{h2}$" indicate the position vectors of the other working body hands 81. Further, "h(x)" is a variable to be "h(x)>=0" when the robot hand exists in the vicinity of the target object to the extent that it can grasp the target object, and satisfies the following relationship with the logical variable $\delta$.

$$\delta = 1 \Leftrightarrow h(x) \geq 0$$

In this equation, the logical variable $\delta$ is set to 1, on the assumption that the robot hand grasps the target object if the robot hand exists in the vicinity of the target object to the extent that it can grasp the target object.

Further, "A" is a drift term representing the dynamics of the other working body hands 81 of the other working body 8 and can be defined by the following equation (2) or (3).

$$A = \begin{bmatrix} \frac{\partial x_{h1}}{\partial t} & o \\ o & \frac{\partial x_{h2}}{\partial t} \end{bmatrix} \Delta t + I \quad (2)$$

$$A = \begin{bmatrix} \Delta x_{h1} & o \\ o & \Delta x_{h1} \end{bmatrix} + I \quad (3)$$

Here, "$\Delta t$" in the equation (2) indicates the time step interval, and "$\partial x_{h1}/\partial t$" and "$\partial x_{h2}/\partial t$" indicate the partial differentiations of the other worker hands 81 with respect to a time step. Further, "$\Delta x_{h1}$" and "$\Delta x_{h2}$" in the equation (3) indicate the displacements of the positions of the other working body hands 81 per one time step.

Here, the equation (1) is a difference equation showing the relationship between the state of the objects at the time step k and the state of the objects at the time step k+1. Then, in the above equation (1), since the state of the grasp is represented by a logic variable that is a discrete value, and the movement of the target objects is represented by a continuous value, the equation (1) shows a hybrid system.

The equation (1) considers not the detailed dynamics of the entire robot 5 and the entire other working body 8 but only the dynamics of the robot hands of the robot 5 that actually grasp the target object and dynamics of the other working body hands 81. Thus, it is possible to suitably reduce the calculation amount of the optimization process by the control input generation unit 35.

Further, the abstract model information I5 includes information for deriving the difference equation according to the equation (1) from the recognition result Im and information on the logical variable corresponding to the operation (the operation of grasping the target object i in the case of pick-and-place) causing the dynamics to switch. Thus, even when there is a variation in the position and the number of the target objects, the area (area G in FIG. 9) where the target objects are to be placed and the number of the robots 5 and the like, the abstract model generation unit 34 can determine the abstract model $\Sigma$ in accordance with the environment of the target workspace based on the abstract model information I5 and the recognition result Im.

It is noted that, in place of the model shown in the equation (1), the abstract model generation unit 34 may generate any other hybrid system model such as mixed logical dynamical (MLD) system, Petri nets, automaton, and their combination.

(6-6) Control Input Generation Unit

The control input generation unit 35 determines the optimal control input for the robot 5 with respect to each time step based on the time step logical formula Lts supplied from the time step logical formula generation unit 33 and the abstract model $\Sigma$ supplied from the abstract model generation unit 34. In this case, the control input generation unit 35 defines an evaluation function for the objective task and solves the optimization problem of minimizing the evaluation function with the abstract model $\Sigma$ and the time step logical formula Lts which function as constraints. For example, the evaluation function is predetermined for each type of the objective task and stored in the memory 12 or the storage device 4.

For example, when the objective task is pick-and-place, the control input generation unit 35 determines the evaluation function so that the control input "$u_k$" and the distance "$d_k$" between the target object to be carried and the goal point to place the target object are minimized (i.e., the energy spent by the robot 5 is minimized). The distance $d_k$ described above corresponds to the distance at the time step k between the target object (i=2) and the area G when the objective task is "the target object (i=2) is eventually present in the area G".

In this case, for example, the control input generation unit 35 determines the evaluation function to be the sum of the square of the distance $d_k$ and the square of the control input $u_k$ in all time steps, and solves the constrained mixed integer optimization problem shown in the following equation (4) with the abstract model $\Sigma$ and the time-step logical formula Lts (that is, the logical OR of the candidates ($\varphi_i$) which function as the constraint conditions.

$$\min_u \left( \sum_{k=0}^{T} (\|d_k\|_2^2 + \|u_k\|_2^2) \right) \quad (4)$$

$$\text{s.t.} \sum$$

$$\vee \phi_i$$

Here, "T" is the number of time steps to be considered in the optimization and it may be a target time step number or may be a predetermined number smaller than the target time step number as described later. In some embodiments, the control input generation unit 35 approximates the logic variable to a continuous value (i.e., solve a continuous relaxation problem). Thereby, the control input generation unit 35 can suitably reduce the calculation amount. When STL is adopted instead of linear temporal logic (LTL), it can be described as a nonlinear optimization problem.

Further, if the target time step number is long (e.g., larger than a predetermined threshold value), the control input generation unit 35 may set the time step number to be used for optimization to a value (e.g., the threshold value described above) smaller than the target time step number. In this case, the control input generation unit 35 sequentially determines the control input $u_k$ by solving the optimization problem based on the above-mentioned expression, for example, every time a predetermined number of time steps elapses.

In some embodiments, the control input generation unit 35 may solve the above-mentioned optimization problem for each predetermined event corresponding to the intermediate state for the accomplishment state of the objective task and determine the control input $u_k$ to be used. In this case, the control input generation unit 35 determines the time step number to be used for the optimization to be the number of time steps up to the next event occurrence. The event described above is, for example, an event in which the dynamics switches in the workspace. For example, when pick-and-place is the objective task, examples of the event include "the robot 5 grasps the target object" and "the robot 5 completes carrying one of the target objects to the destination (goal) point." For example, the event is predetermined for each type of the objective task, and information indicative of one or more events for each type of the objective task is stored in the storage device 4.

(6-7) Subtask Sequence Generation Unit

The subtask sequence generation unit 36 generates a subtask sequence based on the control input information Ic supplied from the control input generation unit 35 and the subtask information I4 stored in the application information storage unit 41. In this case, by referring to the subtask information I4, the subtask sequence generation unit 36 recognizes subtasks that the robot 5 can accept and converts the control input for each time step indicated by the control input information Ic into subtasks.

For example, in the subtask information I4, there are defined functions representing two subtasks, the movement (reaching) of the robot hand and the grasping by the robot hand, as subtasks that can be accepted by the robot 5 when the objective task is pick-and-place. In this case, for example, the function "Move" representing the reaching is a function that uses the following three arguments (parameters): the initial state of the robot 5 before the function is executed; the final state of the robot 5 after the function is executed; and the time to be required for executing the function. In addition, for example, the function "Grasp" representing the grasping is a function that uses the following these arguments: the state of the robot 5 before the function is executed; the state of the target object to be grasped before the function is executed; and the logical variable δ. Here, the function "Grasp" indicates performing a grasping operation when the logical variable δ is "1", and indicates performing a releasing operation when the logic variable δ is "0". In this case, the subtask sequence generation unit 36 determines the function "Move" based on the trajectory of the robot hand determined by the control input for each time step indicated by the control input information Ic, and determines the function "Grasp" based on the transition of the logical variable δ for each time step indicated by the control input information Ic.

Then, the subtask sequence generation unit 36 generates a subtask sequence Sr configured by the function "Move" and the function "Grasp", and supplies the subtask sequence Sr to the robot control unit 17. For example, if the objective task is "the target object (i=2) is finally present in the area G", the subtask sequence generation unit 36 generates the subtask sequence Sr of the function "Move", the function "Grasp", the function "Move", and the function "Grasp" for the robot hand closest to the target object (i=2). In this case, the robot hand closest to the target object (i=2) moves to the position of the target object (i=2) by the function "Move", grasps the target object (i=2) by the function "Grasp", moves to the area G by the function "Move", and places the target object (i=2) in the area G by the function "Grasp".

(7) Process Flow

Figure 10:
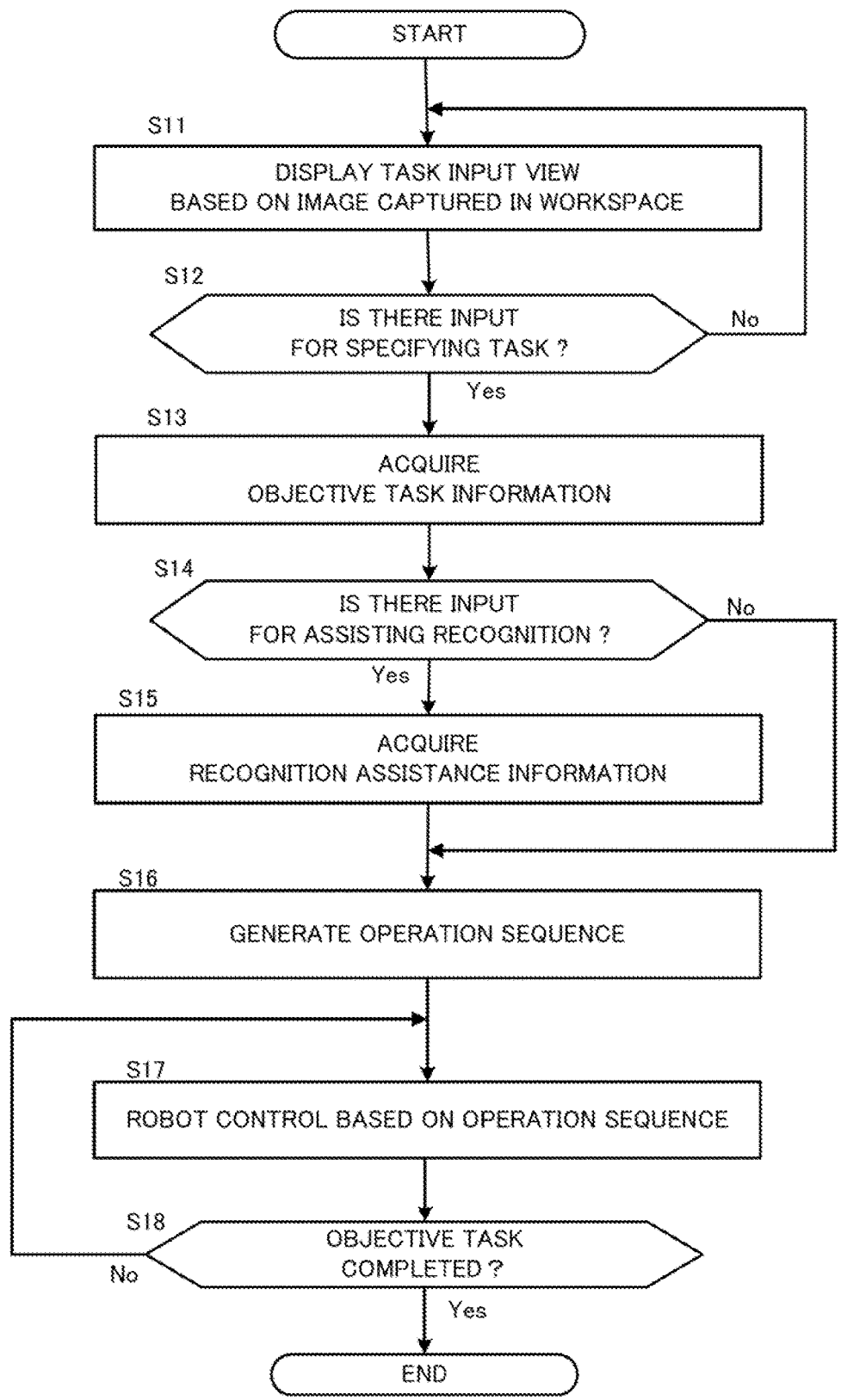
FIG. 10 is an example of a flowchart showing an outline of the robot control process performed by the control device in the first example embodiment.

FIG. 10 is an example of a flowchart showing an outline of the robot control process performed by the control device 1 in the first example embodiment.

First, the display control unit 15 of the control device 1 displays the task input view on the task instruction device 2 based on the workspace image P included in the output signal S4 supplied from the measurement device 7 (step S11). In this case, the display control unit 15 transmits the display information S2 for displaying the task input view to the task instruction device 2 through the interface 13, and the task instruction device 2 displays the task input view based on the display information S2.

Next, the display control unit 15 determines whether or not there is an input for specifying the objective task (step S12). In this case, the display control unit 15 determines whether or not the input information S1 related to the designation of the objective task has been received from the task instruction device 2 which is displaying the task input view. When it is determined that there is an input for specifying the objective task (step S12; Yes), the display control unit 15 acquires the input information S1 on the above-mentioned input as the task designation information Ia (step S13). On the other hand, when there is no input for specifying the objective task (step S12; No), the display control unit 15 continuously displays the task input view on the task instruction device 2 at step S11.

Next, the display control unit 15 determines whether or not there is an input for assisting the recognition of an object in the workspace (step S14). In this case, the display control unit 15 determines whether or not the input information S1 which assists the recognition of one or more objects in the workspace has been received from the task instruction device 2 which is displaying the task input view. Then, when the display control unit 15 determines that there is an input for assisting the recognition of one or more objects in the workspace (step S14; Yes), it acquires the input information S1 on the above-mentioned input as the recognition assistance information Ib (step S15). On the other hand, if there is no input for assisting the recognition of one or more objects in the workspace (step S14; No), the display control unit 15 proceeds with the process at step S16.

The operation sequence generation unit 16 generates a subtask sequence Sr which is an operation sequence for the robot 5 to execute the objective task indicated by the task designation information Ia acquired at step S13 (step S16). In this case, based on the output signal S4, the operation sequence generation unit 16 recognizes objects in the workspace, which is necessary for generating the subtask sequence Sr. Further, when the process at step S15 is executed, the operation sequence generation unit 16 further refers to the recognition assistance information Ib obtained at step S15, and recognizes one or more objects in the workspace. After generating the subtask sequence Sr, the robot control unit 17 supplies the control signal S3 based on the generated subtask sequence Sr to the robot 5 and controls the robot 5 to operate based on the generated subtask sequence Sr (step S17).

Then, the control device 1 determines whether or not the objective task has been completed (step S18). In this case, for example, the control device 1 determines whether or not the objective task has been completed based on the recognition result Im generated from the output signal S4 or a notification signal indicative of the completion of the objective task supplied from the robot 5. When it is determined that the objective task has been completed (step S18; Yes), the control device 1 terminates the process of the flowchart. On the other hand, when it is determined that the objective task has not been completed (step S18; No), the control device 1 gets back to the process at step S17.

(9) Effect

According to the first example embodiment, the control device 1 communicates with the task instruction device 2 through the communication network 3 whose communication quality is not guaranteed, and receives a schematic command schematically indicating the objective task from the task instruction device 2, thereby generating the subtask sequence Sr based on a temporal logic. In this case, the task instruction device 2 transmits the input information S1 corresponding to the task designation information Ia and the recognition assistance information Ib to the control device 1, and does not transmit the information on the control input regarding the position and torque for directly controlling the robot 5 to operate. Therefore, even when a communication delay occurs in the communication network 3, the control device 1 generates the subtask sequence Sr based on the latest environment of the workspace measured by the measurement device 7. Thus, the control device 1 can suitably control the robot 5 without being affected by the communication delay in the communication network 3.

According to the first example embodiment, in terms of the control, the instructions to the robot 5 is not a direct robot control input (torque, speed, joint angle, etc.) but instructions in units of task, and in terms of the recognition, the recognition assistance information Ib is specified by a person. Thereby, it is possible to suitably control the robot 5 through the communication network 3 in which the communication quality is not guaranteed, and it is not required to mount a sophisticated recognition system on the robot 5. Generally, because recognition algorithms are not tolerant of environment variation, recognition algorithms are prone to malfunction when the environment changes. Considering the above, in the first example embodiment, by assisting such a vulnerable recognition algorithm with the recognition assistance information Ib according to human recognition, it is possible to cover the vulnerability of the recognition algorithm. Moreover, since the robot 5 can be controlled through the communication network 3 where the communication quality is not guaranteed, robots existing in the factory in Japan can be controlled by workers existing in various countries in the world.

Further, since the user operating the task instruction device 2 only has to perform the necessary input according to instructions shown on the task input view, the user is not necessary to be a person skilled in the art familiar with the dynamics of the robot 5 and the like. Further, the task instruction device 2 may be a terminal (such as a smartphone or a tablet terminal) having a communication function, a display function, and an input function, and the location for operating the task instruction device 2 may be any place capable of communicating with the control device 1 via an arbitrary communication network 3 such as the Internet. Thus, according to the first example embodiment, it is possible for anyone to easily operate the robot 5 anywhere through the remote control. Therefore, it is conceivable that a worker who performs a schematic instruction of the robot 5 is recruited on the Internet, and that the recruited worker becomes a user of the task instruction device 2 as a short-term worker to perform an input operation to the task input view. In this case, the recruited worker uses a terminal owned by themselves as the task instruction device 2 and then performs required input work according to the guidance on the task input view displayed on the terminal based on the display information S2 supplied from the control device 1.

(10) Modification

Next, a description will be given of modifications of the first example embodiment. The following modifications may be applied in arbitrary combination.

First Modification

The block configuration of the operation sequence generation unit 16 shown in FIG. 8 is an example, and various changes may be applied thereto.

For example, if the information on the candidates φ of the sequence of operations to command the robot 5 is stored in advance in the storage device 4, the operation sequence generation unit 16 executes, based on the above information, the optimization process relating to the control input generation unit 35. Accordingly, the operation sequence generation unit 16 performs the selection of the optimal candidate φ and the determination of the control input to the robot 5. In this case, the operation sequence generation unit 16 may not have a function corresponding to the abstract state setting unit 31, the target logical formula generation unit 32 and the time step logical formula generation unit 33. As described above, information on the execution result of some of the function blocks of the operation sequence generation unit 16 shown in FIG. 8 may be stored in the application information storage unit 41 in advance.

In another example, the application information includes in advance design information such as a flowchart for designing the subtask sequence Sr corresponding to the objective task, and the operation sequence generation unit 16 may generate the subtask sequence Sr by referring to the design information. A specific example for executing a task based on a previously-designed task sequence is disclosed in JP 2017-39170A.

Second Modification

The control device 1 may cause the user of the task instruction device 2 to select the robot 5 subject to input relating to the objective task.

Figure 11:
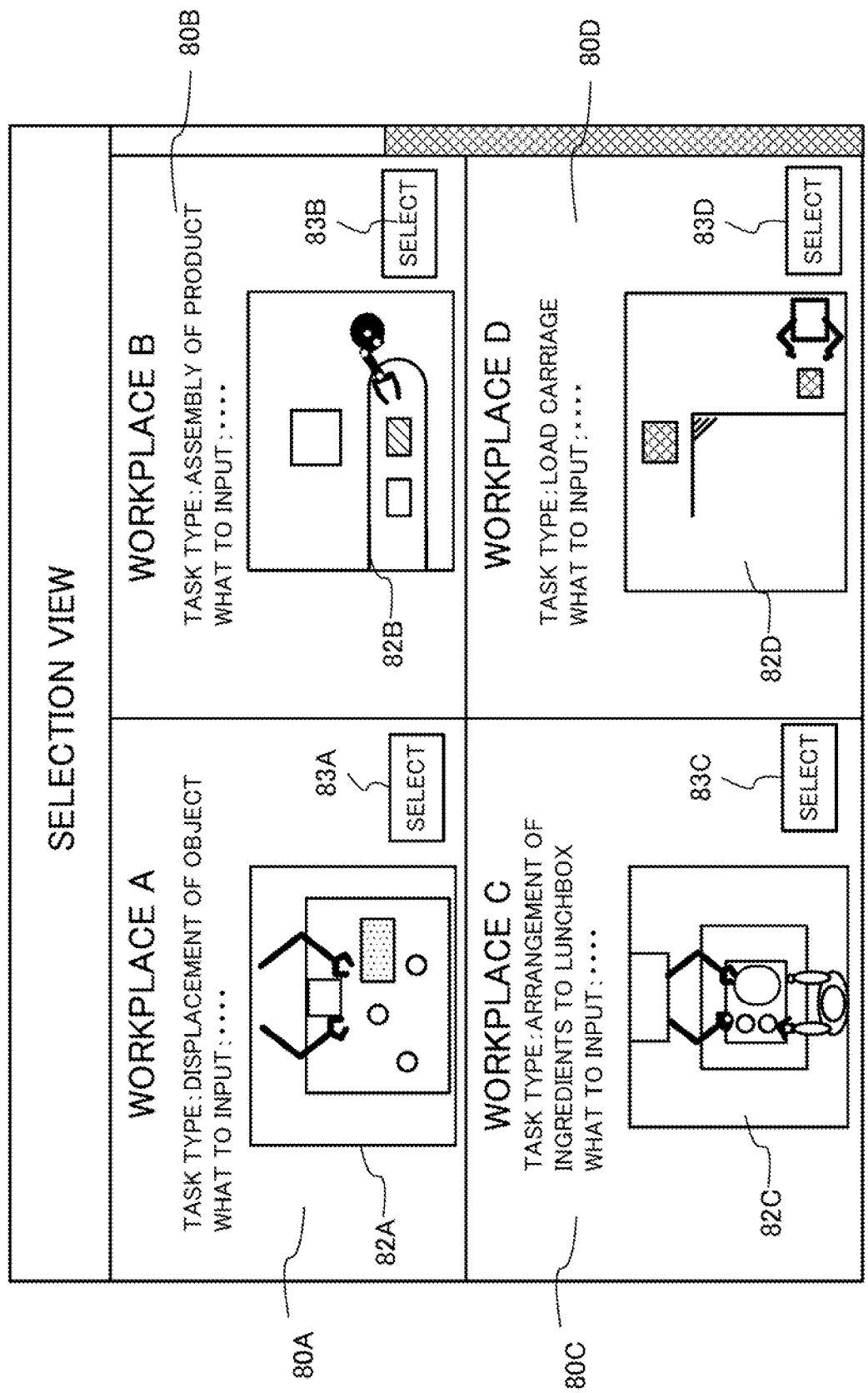
FIG. 11 is a display example of a selection view in a modification.

FIG. 11 is a display example of a selection view of the robot 5 displayed by the task instruction device 2. The display control unit 15 of the control device 1 generates the display information S2 and transmits the display information S2 to the task instruction device 2, thereby causing the task instruction device 2 to display the selection view shown in FIG. 11.

The display control unit 15 displays on a selection view a list of workplaces in which robots 5 which perform operations under the control of the control device 1 are respectively arranged. Here, the display control unit 15 provides individual display fields 80 (80A to 80D, . . . ) for each of at least four workplaces (workplace A to workplace D, . . . ). In each of the individual display fields 80 (80A to 80D, . . . ), there are provided an image 82 (82A to 82D, . . . ) in which each workplace is captured and a selection button 83 (83A to 83D, . . . ). In addition, in each of the individual display fields 80 (80A to 80D, . . . ), there are described "task type" schematically showing the type of the task to be executed by the robot 5 at each workplace and "what to input" schematically showing the content that the user of the task instruction device 2 needs to input.

When detecting that any of the selection buttons 83 is selected, the display control unit 15 displays, on the task instruction device 2, a task input view (see FIGS. 5 to 7) for specifying the objective task for one or more robots 5 present in the workplace corresponding to the selected selection button 83. Then, the display control unit 15 accepts, on the task input view, various inputs described as "what to input" in the individual display field 80 corresponding to the selected selection button 83 to generate the task designation information Ia (and the recognition assistance information Ib).

According to the present modification, the user of the task instruction device 2 can suitably select a target for which the user performs the input operation. Besides, the user of the task instruction device 2 performs a schematic command for plural robots 5 existing in plural workplaces in parallel to thereby manage the work of the plural robots 5 existing in the plural workplaces.

Third Modification

The control device 1 may use sets of the recognition assistance information Ib and the workspace image P as training data for leaning an inference engine configured to detect a specific object in a workspace.

Here, the recognition assistance information Ib corresponds to a correct answer label indicating the correct position or correct range of a specific object shown in the workspace image P. Therefore, the control device 1 stores, in the storage device 4 with respect to each objective task, the sets of the recognition assistance information Ib and the workspace image P which was used for generating the recognition assistance information Ib as the training data. Then, the control device 1 uses the above-described training data for each objective task to learn an inference engine configured to detect a specific object in the workspace, and stores the parameters of the inference engine obtained through learning as the object model information I6 in the storage device 4. Accordingly, the control device 1 can suitably update or generate the object model information 16 for detecting an object in the workspace. It is noted that the above-described learning may be executed by another device other than the control device 1. In this case, the control device 1 transmits, to the other device described above, the training data that is the sets of the recognition assistance information Ib and the workspace image P used for generating the recognition assistance information Ib. In this case, the other device learns the above-described inference engine based on the training data, and updates or generates the object model information I6 stored in the storage device 4 by using the parameters of the inference engine obtained through learning.

Second Example Embodiment

Figure 12:
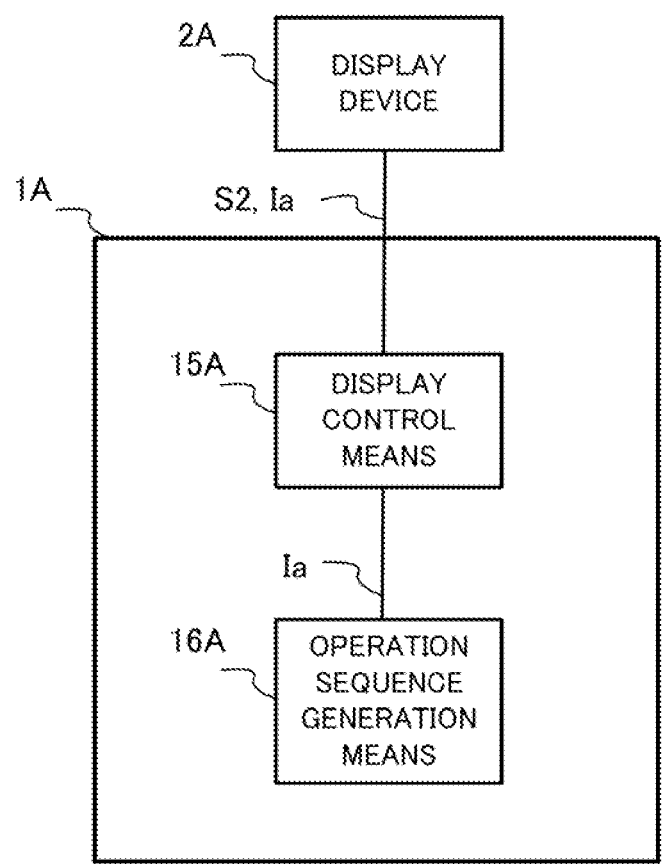
FIG. 12 is an example of a block configuration of the control device in the second example embodiment.

FIG. 12 is a schematic configuration diagram of a control device 1A in the second example embodiment. As shown in FIG. 12, the control device 1A mainly includes a display control means 15A and an operation sequence generation means 16A.

The display control means 15A is configured to transmit display information S2 relating to a task to be executed by a robot to a display device 2A. In this case, examples of the display control means 15A include the display control unit 15 in the first example embodiment, and examples of the display device 2A include the task instruction device 2 in the first example embodiment. Examples of the display information S2 include display information for displaying the task designation view illustrated in FIGS. 5 to 7, and display information for displaying the selection view illustrated in FIG. 11. The control device 1A may be incorporated as a part of the robot or it may be configured separately from the robot.

The operation sequence generation means 16A is configured, in a case that the display control means 15A has received, from the display device 2A, task designation information that is input information which schematically specifies the task, to generate an operation sequence to be executed by the robot based on the task designation information Ia. Examples of the operation sequence include the subtask sequence Sr in the first example embodiment. Examples of the operation sequence generation means 16A include the operation sequence generation unit 16 according to the first example embodiment.

Figure 13:
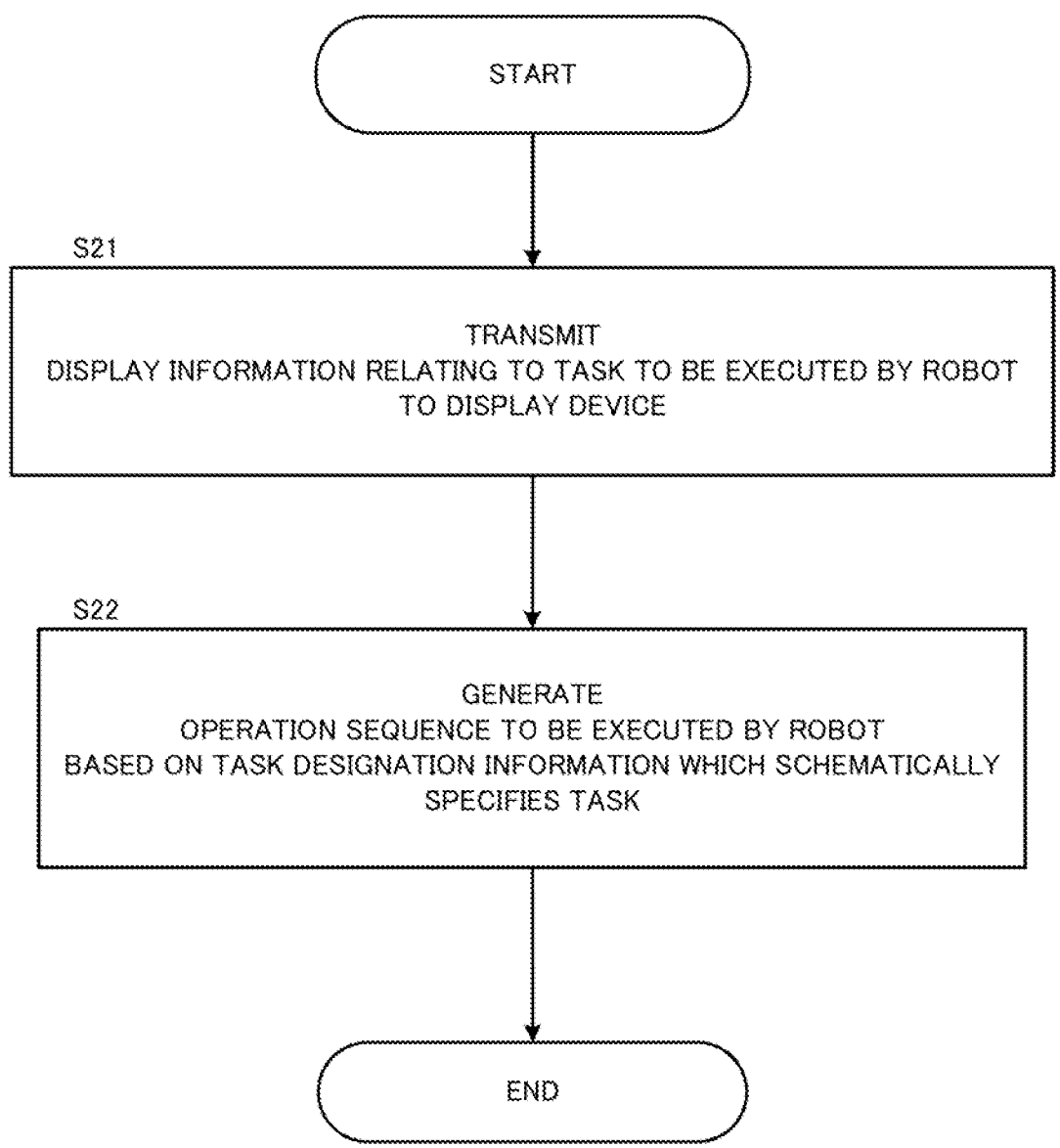
FIG. 13 is an example of a flowchart showing an outline of the robot control process performed by the control device in the second example embodiment.

FIG. 13 is an example of the flowchart executed by the control device 1A in the second example embodiment. First, the display control means 15A transmits display information S2 relating to a task to be executed by a robot to a display device 2A (step S21). Then, in a case that the display control means 15A has received, from the display device 2A, task designation information that is input information which schematically specifies the task, the operation sequence generation means 16A generates an operation sequence to be executed by the robot based on the task designation information Ia (step S22).

According to the configuration in the second example embodiment, the control device 1A can suitably generate an operation sequence to be executed by a robot based on an input that schematically specifies a task.

In the example embodiments described above, the program is stored by any type of a non-transitory computer-readable medium (non-transitory computer readable medium) and can be supplied to a processor or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above can be described as, but not limited to, the following Supplementary Notes.

Supplementary Note 1

A control device comprising:
a display control means configured to transmit display information relating to a task to be executed by a robot to a display device; and an operation sequence generation means configured,
in a case that the display control means has received, from the display device, task designation information that is input information which schematically specifies the task,
to generate an operation sequence to be executed by the robot based on the task designation information.

Supplementary Note 2

The control device according to Supplementary Note 1, wherein the display control means is configured to transmit the display information including a workspace image that is an image of a workspace of the robot to the display device, and
wherein the operation sequence generation means is configured to determine the task to be executed by the robot based on the task designation information generated by an input with reference to the workspace image.

Supplementary Note 3

The control device according to Supplementary Note 1 or 2,
wherein the operation sequence generation means is configured,
in a case that the display control means has received, from the display device, recognition assistance information that is input information for assisting recognition of an object relating to the task,
to generate the operation sequence by recognizing the object based on the recognition assistance information.

Supplementary Note 4

The control device according to Supplementary Note 3, wherein the display control means is configured to transmit the display information including a workspace image that is an image of a workspace of the robot to the display device, and
wherein the operation sequence generation means is configured to recognize the object based on the recognition assistance information generated by an input with reference to the workspace image.

Supplementary Note 5

The control device according to Supplementary Note 4, wherein the display control unit is configured to acquire the recognition assistance information and the workspace image as training data to be used for learning an inference engine configured to perform inference regarding the object.

Supplementary Note 6

The control device according to any one of Supplementary Notes 1 to 5,
wherein the display control means is configured to communicate the display information and the input information with the display device via a communication network in which communication quality is not guaranteed.

Supplementary Note 7

The control device according to any one of Supplementary Notes 1 to 6,
wherein,
after transmitting display information on a selection view for selecting the robot subject to generation of the operation sequence,
the display control means is configured to transmit, to the display device, display information on a task input view for specifying the task to be executed by the robot selected on the selection view.

Supplementary Note 8

The control device according to any one of Supplementary Notes 1 to 7,
wherein the operation sequence generation means comprises:
a logical formula conversion means configured to convert an objective task, which is specified by the task designation information, into a logical formula based on a temporal logic;
a time step logical formula generation means configured to generate, from the logical formula, a time step logical formula that is a logical formula representing states at each time step for completing the objective task; and
a subtask sequence generation means configured to generate, based on the time step logical formula, the operation sequence that is a sequence of subtasks to be executed by the robot.

Supplementary Note 9

The control device according to Supplementary Note 8, wherein the operation sequence generation means further comprises:
an abstract state setting means configured to set a proposition to be used in the logical formula, the proposition corresponding to an abstract state of an object relating to the task.

Supplementary Note 10

A control method executed by a computer, the control method comprising:
transmitting display information relating to a task to be executed by a robot to a display device; and,
in a case of receiving, from the display device, task designation information that is input information which schematically specifies the task,
generating an operation sequence to be executed by the robot based on the task designation information.

Supplementary Note 11

A storage medium storing a program executed by a computer, the program causing the computer to function as:
a display control means configured to transmit display information relating to a task to be executed by a robot to a display device; and
an operation sequence generation means configured,
in a case that the display control means has received, from the display device, task designation information that is input information which schematically specifies the task,
to generate an operation sequence to be executed by the robot based on the task designation information.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1A Control device
2 Task instruction device
2A Display device
3 Communication network
4 Storage device
5 Robot
7 Measurement device
8(8A, 8B) Other working body
41 Application information storage unit
100 Control system

What is claimed is:
1. A control device comprising:
at least one memory storing instructions; and
at least one processor configured to execute the instructions to:
  transmit, to a display device, display information including a workspace image of a workspace of a robot which executes a task;
  upon receiving, from the display device, task designation information that is input information which specifies a position or a destination of an object for the execution of the task:
    convert an objective task specified by the task designation information, into a logical formula based on a temporal logic;
    generate, from the logical formula, a time step logical formula representing states at each time step for completing the objective task; and
    generate an operation sequence to be executed by the robot, based on the task designation information and based on the time step logical formula; and
  control the robot to execute the operation sequence that has been generated.
2. The control device according to claim 1,
wherein the at least one processor is configured to execute the instructions to determine the task based on the task designation information generated with reference to the workspace image.
3. The control device according to claim 1,
wherein the at least one processor is configured to execute the instructions to,
  in a case of receiving, from the display device, recognition assistance information for assisting recognition of the object,
  generate the operation sequence by recognizing the object based on the recognition assistance information.
4. The control device according to claim 3,
wherein the at least one processor is configured to execute the instructions to recognize the object based on the recognition assistance information generated with reference to the workspace image.

5. The control device according to claim 4,
wherein the at least one processor is configured to execute the instructions to acquire the recognition assistance information and the workspace image as training data to be used for learning an inference engine configured to perform inference regarding the object.
6. The control device according to claim 1,
wherein the at least one processor is configured to execute the instructions to communicate the display information and the input information with the display device via a communication network in which communication quality is not guaranteed.
7. The control device according to claim 1,
wherein,
  after transmitting display information on a selection view for selecting the robot subject to generation of the operation sequence,
  the at least one processor is configured to execute the instructions to transmit, to the display device, display information on a task input view for specifying the task selected on the selection view.
8. The control device according to claim 1,
wherein the at least one processor is configured to execute the instructions to
  set a proposition to be used in the logical formula, the proposition corresponding to an abstract state of the object.
9. A control method performed by a computer and comprising:
transmitting, to a display device, display information including a workspace image of a workspace of a robot which executes a task;
upon receiving, from the display device, task designation information that is input information which specifies a position or a destination of an object for the execution of the task;
  converting an objective task specified by the task designation information, into a logical formula based on a temporal logic;
  generating, from the logical formula, a time step logical formula representing states at each time step for completing the objective task; and
  generating an operation sequence to be executed by the robot, based on the task designation information and based on the time step logical formula; and
controlling the robot to execute the operation sequence that has been generated.
10. A non-transitory computer readable storage medium storing a program executable by a computer to perform processing comprising:
transmitting, to a display device, display information including a workspace image of a workspace of a robot which executes a task;
upon receiving, from the display device, task designation information that is input information which specifies a position or a destination of an object for the execution of the task;
  converting an objective task specified by the task designation information, into a logical formula based on a temporal logic;
  generating, from the logical formula, a time step logical formula representing states at each time step for completing the objective task; and
  generating an operation sequence to be executed by the robot, based on the task designation information and based on the time step logical formula; and controlling the robot to execute the operation sequence that has been generated.

* * * * *